United States Patent [19]

Moriya

[11] Patent Number: 4,992,863
[45] Date of Patent: Feb. 12, 1991

[54] COLORED IMAGE READING APPARATUS

[75] Inventor: Shigeru Moriya, Osaka, Japan

[73] Assignee: Minolta Camera Kabushiki Kaisha, Osaka, Japan

[21] Appl. No.: 286,884

[22] Filed: Dec. 20, 1988

[30] Foreign Application Priority Data

| Dec. 22, 1987 | [JP] | Japan | 62-325090 |
| Dec. 22, 1987 | [JP] | Japan | 62-325091 |
| Jul. 4, 1988 | [JP] | Japan | 63-166390 |
| Jul. 4, 1988 | [JP] | Japan | 63-166391 |

[51] Int. Cl.$^5$ .............................................. H04N 1/46
[52] U.S. Cl. ........................................ 358/80; 358/75
[58] Field of Search ................. 358/75, 75 IJ, 78, 79, 358/80

[56] References Cited

U.S. PATENT DOCUMENTS

| 4,206,998 | 6/1980 | Tokuda | 355/38 |
| 4,458,265 | 7/1984 | Yoshida et al. | 358/78 |
| 4,598,282 | 7/1986 | Pugsley | 340/703 |
| 4,679,074 | 7/1987 | Sugiura et al. | 358/80 |
| 4,782,390 | 11/1988 | Hayashi et al. | 358/80 |
| 4,789,892 | 12/1988 | Tsuzuki et al. | 358/80 |
| 4,792,847 | 12/1988 | Shimazaki et al. | 358/75 |
| 4,819,193 | 4/1989 | Imao | 364/526 |
| 4,829,323 | 5/1989 | Suzuki et al. | 358/80 |
| 4,845,550 | 7/1989 | Urabe et al. | 358/75 |

FOREIGN PATENT DOCUMENTS

| 0084228 | 7/1983 | European Pat. Off. | 358/80 |
| 58-142676 | 8/1983 | Japan | 358/75 |
| 58-220566 | 12/1983 | Japan | 358/80 |
| 59-163962 | 9/1984 | Japan | 358/75 |
| 59-171289 | 9/1984 | Japan | 358/80 |
| 60-10251 | 1/1985 | Japan | 358/80 |
| 60-146574 | 8/1985 | Japan | 358/80 |
| 60-216670 | 10/1985 | Japan | |
| 60-220660 | 11/1985 | Japan | 358/80 |

Primary Examiner—James J. Groody
Assistant Examiner—Mark R. Powell
Attorney, Agent, or Firm—Burns, Doane, Swecker & Mathis

[57] ABSTRACT

A colored image reading apparatus in which the light-intensity signals produced in response to the red, green and blue color components of the light carrying the image information pickup up from a given document sheet bearing multi-colored images are converted into quantity-of-ink data signals indicating the quantities of cyanic-, magenta- and yellow-colored inks to be used for the formation of colored pixels, wherein the conversion of the color-density signals into the quantity-of-ink data signals is effected by a conversion table into which are stored quantity-of-ink data produced through mathematic calculation involving logarithmic conversion of variable values which are generated as the products of multiplication between a set of fixed parameters and numerical values respectively representing the color densities indicated by the light-intensity signals. The set of parameters is selected from among a plurality of sets of parameters including optional sets of parameters and a standard set of parameters. Any of the plurality of optional sets of parameters may be selected either manually by the operator or through preliminary detection of the predominant color used in the original multicolor images. The standard set of paremeters is selected for use when none of the optional sets of parameters is selected. The color image reading apparatus of the present invention permits naturally colored images to be reproduced accurately.

10 Claims, 12 Drawing Sheets

COLORED IMAGE READING APPARATUS

FIELD OF THE INVENTION

The present invention relates to a colored image reading apparatus for use in or with a digital color printer and, more particularly, to a colored image reading apparatus of the type responsive to multi-color images for producing signals for use in reproducing the original images.

DESCRIPTION OF THE RELATED ART

FIG. 1 of the drawings shows an example of a prior-art colored image reading apparatus to which the present invention generally relates. As shown, the colored image reading apparatus is used to read images on an original document sheet D bearing multi-colored images thereon and comprises a source of light which is typically implemented by a white-light illuminating lamp 20. The document sheet D is irradiated with the light emanating from the lamp 20 and incident on the image-bearing face of the document sheet D. The illuminating lamp 20 is driven for reciprocating movement in the directions of arrowheads a and a' by suitable drive means such as typically a reversible-motion scanner drive motor 22. The image-bearing face of the document sheet D is thus optically scanned by the light from the lamp 20 thus moved with respect to the document sheet D and the resultant information-carrying beam reflected from the document sheet D is directed to an image sensor 24 which is also held in a predetermined position with respect to the document sheet D. The image sensor 24 is typically implemented by three linear arrays of charge-coupled devices (CCD's) arranged in combination with color filter elements for red, green and blue, respectively.

Activated by the incident information-carrying beam, the image sensor 24 produces color-density signals $V_r$, $V_g$ and $V_b$ of different voltage levels representing the intensities of light of the red, green and blue components, respectively, of the light passed through the color filter elements. These voltage signals $V_r$, $V_g$ and $V_b$ are supplied sequentially to a logarithmic amplifier 26 and are thereby converted into color-density signals $V_R$, $V_G$ and $V_B$ which are representative of the respective densities of color of the red, green and blue components of the light reflected from the document sheet D. As well known in the art, a logarithmic amplifier is implemented by an operational amplifier having a feedback transistor and is operative to produce in response to an input voltage $V_{in}$ an output voltage $V_{out}$ expressed in the form $-a.\log V_{in} + b$ where a and b are fixed parameters.

The analog color-density signals $V_R$, $V_G$ and $V_B$ are fed to an analog-to-digital (A/D) converter 28 and are converted into corresponding digital color-density signals $D_r$, $D_g$ and $D_B$, respectively. The digital color-density signals $D_r$, $D_g$ and $D_b$ thus output from the analog-to-digital converter 28 are supplied to a shading generator circuit 30 which compensates for the spurious response components which may be contained in the input signals $D_r$, $D_g$ and $D_b$. Such spurious response components of the signals $D_r$, $D_g$ and $D_b$ may be created by the nonuniform background level of the detected image due to, for example, the shading of the light generated by the illuminating lamp 20 and/or the irregularities in performance characteristics of the component elements and devices forming the image sensor 24.

The corrected digital color-density signals, now denoted $D_R$, $D_G$ and $D_B$, are transferred to a masking circuit 32 through which the signals $D_R$, $D_G$ and $D_B$ are processed to produce signals $S_C$, $S_M$ and $S_Y$ respectively indicative of the quantities of cyanic-, magenta- and yellow-colored inks to be used for the reproduction of the images represented by the supplied signals $D_R$, $D_G$ and $D_B$. The signals $S_M$, $S_Y$ and $S_C$ thus output from the masking circuit 32 are supplied to a half-tone generator circuit 34 which produces dither-processed signals variable with the supplied digital signals $S_M$, $S_Y$ and $S_C$. The dither-processed signals are supplied to the driver circuits for the ink-jet nozzles of, for example, a color printer (not shown) and are used for the control of the quantities of the cyanic-, magenta-, and yellow-colored inks to be ejected from the print head of the printer. The analog-to-digital converter 28, shading amplifier 30, masking circuit 32 and half-tone generator circuit 34 as hereinbefore described operate under the control of a microprocessor 36 (MPU), which also controls a driver circuit 38 for the scanner drive motor 22.

The masking circuit 32 included in the prior-art colored image reading apparatus is typically of the type disclosed in Japanese Provisional Patent Publication (Kokai) No. 60-216670. The device therein taught uses a conversion table storing the products of multiplication each of a fixed parameter predetermined for each of the colors available and a variable parameter indicated by each of the digital color-density signals $D_R$, $D_G$ and $D_B$. The fixed multiplicand parameters, $a_{00}$ to $a_{22}$, used in such multiplication are determined by the spectral reflectance and printing characteristics of the cyanic-, magenta- and yellow-colored inks to be used. The data output from the conversion table in respect of the color-density signals $D_R$, $D_G$ and $D_B$ are summed up and the resultant signals are output as the signals $D_M$, $D_Y$ and $D_C$ from the masking circuit 32.

The fixed multiplicand parameters $a_{00}$ to $a_{22}$ used in the known masking circuit 32 are determined to enable reproduction of images of particular hues more preferentially over images of other hues. These parameters are prescribed such that the pixels printed on the basis of the signals output from the masking circuit 32 have color tone characteristics which are as close to those of given sample colors as possible. For this purpose, the parameters $a_{00}$ to $a_{22}$ used in the masking circuit 32 are determined so that the value $\Delta E^2$ given by the following equation is minimized:

$$\Delta E^2 = (L^* - L^{*\prime})^2 + (a^* - a^{*\prime})^2 + (b^* - b^{*\prime})^2 \qquad \text{Eq. 1}$$

where $L^*$, $a^*$ and $b^*$ are values specific to a given sample color in the uniform color space ($L^*$, $a^*$, $b^*$) and $L^{*\prime}$, $a^{*\prime}$ and $b^{*\prime}$ are values indicative of the attributes of the corresponding color of the printed pixels. It will be readily understood that minimizing the value $\Delta E^2$ given by this Equation 1 is essentially effective to "average" the color tone characteristics of the images to be reproduced on the basis of the signals output from the masking circuit 32.

A prior-art masking circuit of the type using the parameters $a_{00}$ to $a_{22}$ thus prescribed is advantageous for the duplication of an original document bearing images in colors uniformly distributed in the image pattern. However, the prior-art masking circuit is not adapted for producing naturally colored images when used for the reproduction of images in colors distributed irregularly in the original image pattern. Examples of such colored image patterns include those of seascapes, those of scenes in the background of skyscapes, and those of portraits. For the reproduction of, for example, a portrait showing a person's face with a green background, it will be preferable that the person's face in the reproduction be colored to have more likeness to the original than the likeness which the reproduced background has to the original although the background may be larger in proportion than the person's face. Where the color tone characteristics of the images to be reproduced are "averaged" as in the above described manner, both the person's face and the green background in the reproduction are colored to have equal degrees of likeness to the originals and could not be perceived to be naturally colored.

Another problem of the masking circuit disposed in the named Publication results from the fact that the conversion table of the circuit is provided by a plurality of read-only memories storing data representative of all the possible densities of color for each of the colors available. Each of the read-only memories forming the conversion table is therefore required to have a storage capacity which is large enough to store a large amount of data. The use of such a memory is objectionable not only for the purpose of scaling down the total storage capacity of the conversion table as a whole but also for the difficulty in modifying the multiplicand parameter in adjusting the color tones to be produced on the basis of the signals ($S_M$, $S_Y$ and $S_C$) output from the masking circuit.

SUMMARY OF THE INVENTION

Accordingly, it is an important object of the present invention to provide an improved colored image reading apparatus which is capable of producing naturally colored images whether the colors of the images to be duplicated may be distributed uniformly or irregularly in the original image pattern.

It is another important object of the present invention to provide an improved colored image reading apparatus having a masking circuit in which a conversion table is provided by small-capacity random-access memories into which are to be stored only the data indicating the quantities of the inks of different colors in response to the currently supplied color-density signals.

In accordance with a first outstanding aspect of the present invention, there is provided a colored image reading apparatus for use in reproducing multi-color images with toning materials of different colors and having different properties, comprising (a) a color image sensor operative to optically scan a document bearing multi-color images to read the images on the document and produce color-density signals respectively variable with the intensities of light of the red, green and blue components of the images, (b) masking means for converting the color-density signals into signals dictated by the properties of the toning materials with which the images are to be reproduced, the masking means comprising (b/1) first memory means of the random-access type, (b/2) second memory means storing data representative of a plurality of sets of parameters, each set of parameters being provided in respect of each of a plurality of colors each having a limited range of hues and being prescribed to enable reproduction of images of particular hues preferentially over images of other hues, c) calculating means operative to selectively fetch any of the plurality of sets of parameters from the second memory means, generate data representative of the products of multiplication between the parameters of the selected set and numerical values respectively represented by the color-density signals, convert the products of multiplication into corresponding logarithmic values of the products of multiplication and produce data representative of the resultant logarithmic values, and load the data representative of the logarithmic values into the first memory means, and d) input/output means operative to supply to the first memory means address signals provided by the color-density signals input to the masking means, fetch the data stored in the first memory means, and generate data representative of the sum of the logarithmic values concerning the red, green and blue components of the images, and output the data representative of the sum of the logarithmic values as data effective to reproduce the multi-color images.

In accordance with a second outstanding aspect of the present invention, there is provided a colored image reading apparatus for use in reproducing multi-color images with toning materials of different colors and having different properties, comprising (a) a color image sensor operative to optically scan a document bearing multi-color images to read the images on the document and produce color-density signals respectively variable with the intensities of light of the red, green and blue components of the images, (b) masking means for converting the color-density signals into signals dictated by the properties of the toning materials with which the images are to be reproduced, the masking means being responsive to a plurality of sets of parameters, each set of parameters being provided in respect of each of a plurality of colors each having a limited range of hues and being prescribed to enable reproduction of images of particular hues preferentially over images of other hues, the masking means comprising (b/1) converting means operative to generate data representative of the products of multiplication between the parameters of the selected set and numerical values respectively represented by the color-density signals, (b/2) summing means for converting the products of multiplication into corresponding logarithmic values of the products of multiplication, producing data representative of the resultant logarithmic values, and generating data representative of the sum of the logarithmic values concerning the red, green and blue components of the images.

In accordance with a third outstanding aspect of the present invention, there is provided a colored image reading apparatus for use in reproducing multi-color images with toning materials of different colors and having different properties, comprising (a) a color image sensor operative to optically scan a document bearing multi-color images to read the images on the document and produce color-density signals respectively variable with the intensities of light of the red, green and blue components of the images, (b) scanning means for driving one of the color image sensor and the document for reciprocating movement with respect to the other for enabling the color image sensor to optically scan the images on the document, the scanning means being operative to drive the one of the color image sensor and the document for a single cycle of reciprocating movement during reproduction of multi-color images with the toning material of a single color, each cycle of reciprocating movement of the scanning means consisting of a former half for driving one of the color image sensor and the document for movement in one direction with respect to the document and enabling the color image sensor to optically scan the images on the document and a latter half for driving the one of the color image sensor and the document for movement in the reverse direction with respect to the document, (b) masking means for converting the color-density signals into signals dictated by the properties of the toning materials with which the images are to be reproduced, the masking means comprising (b/1) first memory means of the random-access type, (b/2) second memory means storing a plurality of sets of data for use in converting the color-density signals into the signals dictated by the properties of the toning materials, each set of data being provided in respect of each of a plurality of colors each having a limited range of hues and being prescribed to enable reproduction of images of particular hues preferentially over images of other hues, each of the plurality of sets of data comprising a plurality of data elements respectively corresponding to the colors of the toning materials, the data elements being effective to convert the color-density signals concerning the red, green and blue components of the scanned images into signals concerning the colors of the toning materials, c) control means operative to selectively fetch any of the plurality of sets of data from the second memory means and a particular one of the data elements in the selected set of data during the latter half of a cycle of reciprocating movement of the scanning means, the particular one of the data elements corresponding to the color of one of the toning materials in which the images are to be reproduced subsequently to the cycle of reciprocating movement of the scanning means during which the images are to be reproduced in the color of another toning material, generate data representative of the products of multiplication between the data elements of the selected set of data and numerical values respectively represented by the color-density signals, convert the products of multiplication into corresponding logarithmic values of the products of multiplication and produce data representative of the resultant logarithmic values, and load the data representative of the logarithmic values into the first memory means, and d) input/output means operative to supply to the first memory means address signals provided by the color-density signals input to the masking means, fetch the data stored in into the first memory means and generate data representative of the sum of the logarithmic values concerning the red, green and blue components of the images, and output the data representative of the sum of the logarithmic values as data effective to reproduce the multicolor images.

In accordance with a fourth outstanding aspect of the present invention, there is provided a colored image reading apparatus for use in reproducing multi-color images with toning materials of different colors and having different properties, comprising (a) a color image sensor operative to optically scan a document bearing multi-color images to read the images on the document and produce color-density signals respectively variable with the intensities of light of the red, green and blue components of the images, (b) scanning means for driving one of the color image sensor and the document for reciprocating movement with respect to the other for enabling the color image sensor to optically scan the images on the document, the scanning means being operative to drive the one of the color image sensor and the document for a single cycle of recirocating movement during reproduction of multi-color images with the toning material of a single color, (c) masking means for converting the color-density signals into signals dictated by the properties of the toning materials with which the images are to be reproduced, the masking means being responsive to a plurality of sets of parameters, each set of parameters being provided in respect of each of a plurality of colors each having a limited range of hues and being prescribed to enable reproduction of images of particular hues preferentially over images of other hues, the masking means comprising (c/1) converting means operative to generate data representative of the products of multiplication between the parameters of the selected set and numerical values respectively represented by the color-density signals, (c/2) summing means for converting the products of multiplication into corresponding logarithmic values of the products of multiplication, producing data representative of the resultant logarithmic values, and generating data representative of the sum of the logarithmic values concerning the red, green and blue components of the images, and (d) selecting means operative to preliminarily scan the images on the document before the images on the document are read by the color image sensor, the selecting means being responsive to the color-density signals supplied from the color image sensor and capable of selecting any of the plurality of sets of parameters to be processed by the converting means.

BRIEF DESCRIPTION OF THE DRAWINGS

The features and advantages of a colored image reading apparatus according to the present invention will be more clearly appreciated from the following description taken in conjunction with the accompanying drawings in which.

DESCRIPTION OF THE PREFERRED EMBODIMENT

General Construction and Arrangement of Embodiment

Figure 1:
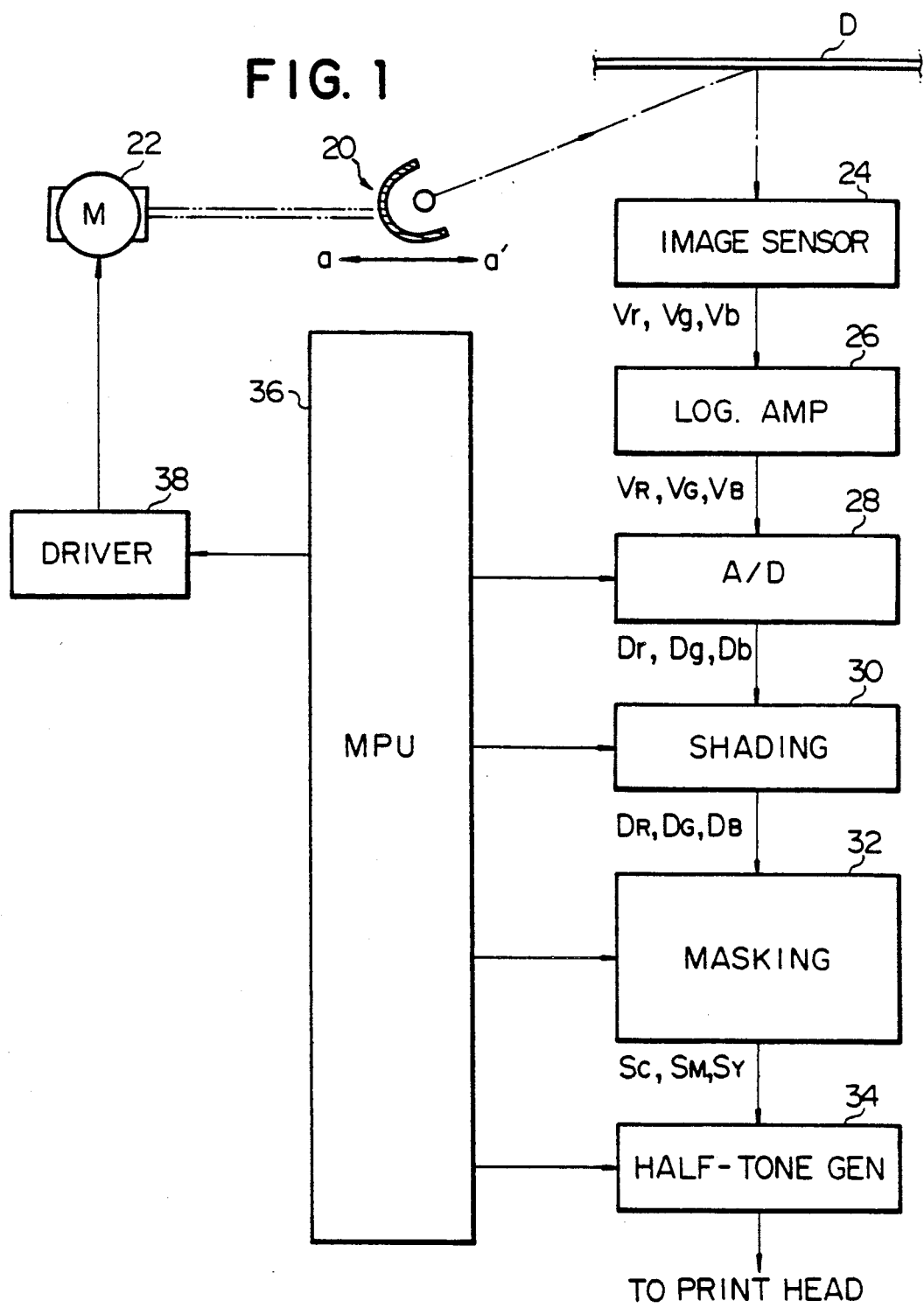
FIG. 1 is a block diagram showing an example of a prior-art colored image reading apparatus of the type to which the present invention generally appertains.
Figure 2:
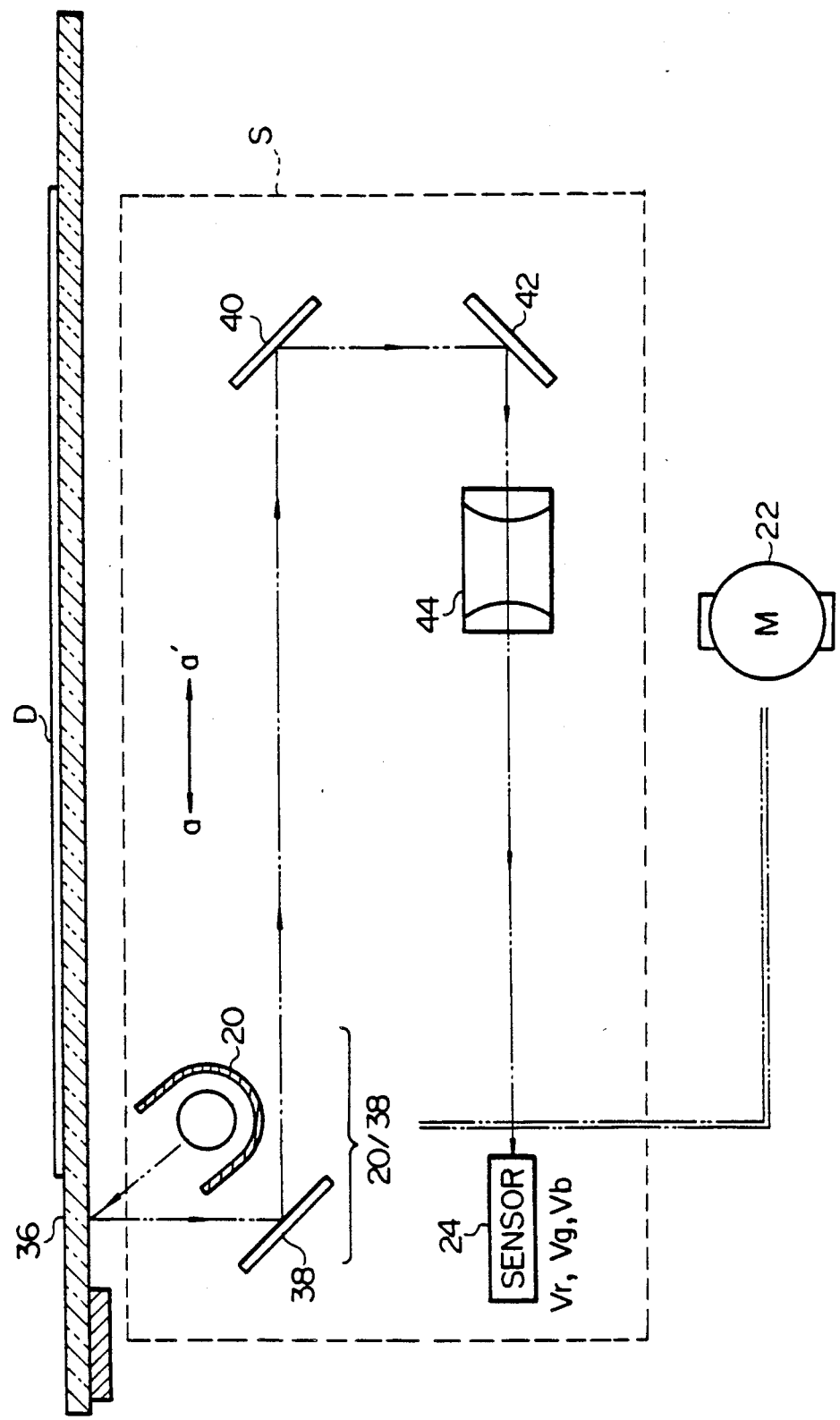
FIG. 2 is a schematic side elevation view showing, partly in section, an example the arrangement of an optical scanning system included in a color printer into which a colored image reading apparatus according to the present invention may be incorporated.

Referring to FIG. 2, a colored image reading apparatus embodying the present invention is basically similar to that of the prior-art colored image reading apparatus of FIG. 1 in that the apparatus comprises a source of light implemented by a white-light illuminating lamp 20 and a reversible-motion scanner drive motor 22. The scanner drive motor 22 is operatively coupled with the illuminating lamp 20 and drives the lamp 20 for reciprocating movement in the directions of arrowheads a and a' by the motor 22. The light incident on the document sheet D and reflected therefrom is directed to an image sensor 24 through an optical scanning system S implemented by a suitable combination of reflector mirrors and lenses.

In FIG. 2, such an optical scanning system S is shown provided underneath a transparent document support table 36 and comprises first, second and third reflector mirrors 38, 40 and 42 and a projection lens unit 44. The first reflector mirror 38 is angled at 45 degrees to the document support table 36 and is movable with the illuminating lamp 20. The document sheet D is placed on the document support table 36 with its image-bearing face directed downward and is held in place by means of a cover board which presses the document sheet D against the upper face of the table 36.

The beam of light emitted from the illuminating lamp 20 is incident on the downwardly directed image-bearing face of the document sheet D and picks up images on the document sheet D. The resultant information-carrying beam of light is reflected from the document sheet D to the first reflector mirror 38 and is re-directed by the second and third reflector mirrors 40 and 42. Past the third reflector mirror 42, the light passes through the projection lens unit 44 and is incident on the light receiving face of the image sensor 24.

The optical scanning system S constructed and arranged herein shown is merely for the purpose of illustration and may be modified in numerous manners if desired.

The illuminating lamp 20 and the first reflector mirror 38 in the optical scanning system S are supported on a common carrier and, in combination, implement an image scanner 20/38 in the colored image reading apparatus embodying the present invention. The scanner drive motor 22 is controlled to drive the image scanner 20/38 to make three cycles of reciprocating movement for the scanning of a single document sheet D. The first cycle of reciprocating movement results in production of signals on the basis of which pixels are to be printed in cyan. The second cycle of reciprocating movement is effected to produce signals for the printing of pixels in magenta. The third cycle of reciprocating movement is for the production of signals on the basis of which pixels are to be printed in yellow.

As the document sheet D is thus optically scanned in three consecutive steps, the image sensor 24 sequentially produces voltage signals $V_r$, $V_g$ and $V_b$ representing the intensities of the red, green and blue components, respectively, of the light incident on the image sensor 24. The image sensor 24 used in the embodiment of the present invention is also assumed to be implemented by three linear arrays of charge-coupled devices arranged in combination with color filter elements for red, green and blue, respectively.

The analog color-density signals $V_r$, $V_g$ and $V_b$ produced from the image sensor 24 are supplied to a signal processing system comprising first, second and third analog-to-digital converters 28a, 28b and 28c and are thereby converted into corresponding eight-bit digital signals $G_r$, $G_g$ and $G_b$, respectively. The digital color-density signals $G_r$, $G_g$ and $G_b$ thus output from the analog-to-digital converters 28a, 28b and 28c are supplied through parallel signal lines to first, second and third shading generator circuits 30a, 30b and 30c, respectively, each of which is operative to compensate for the spurious response components which may be contained in the input signal $G_r$, $G_g$ or $G_b$ as in the prior-art colored image reading apparatus described with reference to FIG. 1. The corrected digital color-density signals, now denoted $G_R$, $G_G$ and $G_B$, are transferred to a masking circuit 50 through which the signals $G_R$, $G_G$ and $G_B$ are referenced to produce signals $H_C$, $H_M$ and $H_Y$ indicative of the quantities $Q_C$, $Q_M$ and $Q_Y$ of the cyanic-, magenta- and yellow-colored inks, respectively, to be actually used for the reproduction of the images represented by the supplied signals $G_R$, $G_G$ and $G_B$, respectively.

The signals $H_C$, $H_M$ and $H_Y$ thus output from the masking circuit 32 are supplied to a half-tone generator circuit 34 which produces dither-processed signals variable with the supplied digital signals $H_C$, $H_M$ and $H_Y$. The dither-processed signals are supplied to driver circuits for the ink-jet nozzles of, for example, a multi-color print head (not shown) of the apparatus and are used for the control of the quantities $Q_C$, $Q_M$ and $Q_Y$ of the cyanic-, magenta-, and yellow-colored inks to be ejected from the print head.

The analog-to-digital converters 28a, 28b and 28c, shading generator circuits 30a, 30b and 30c, masking circuit 50 and half-tone generator circuit 34 as hereinbefore described operate under the control of a semiconductor microprocessor 52, which also controls the driver circuits 54 and 56 for the image scanner 20/38 and scanner drive motor 22. The microprocessor 52 is connected to a read-only memory 58 which has stored therein data representing fixed multiplicand parameters $a_{00}$ to $a_{22}$. During operation of the apparatus, the microprocessor 52 fetches these data from the memory 58 to generate quantity-of-ink data DQ representative of a plurality of sets of products of multiplication of the parameters $a_{00}$ to $a_{22}$ multiplied by the variable multipliers given by the digital color-density signals $G_R$, $G_G$ and $G_B$, as will be described in more detail.

While the color printer with which an colored image reading apparatus according to the present invention is to be used in combination is typically of the ink-jet type, the printer of such a type may be substituted by a printing apparatus of another type such as a thermal transfer printer and an electrophotographic printer. Thus, it should be borne in mind that the term "ink" herein referred to may mean not only an ordinary printing fluid but any of the toning materials used in printers in general including those of the described types.

Construction and Operation of Masking Circuit

Figure 4:
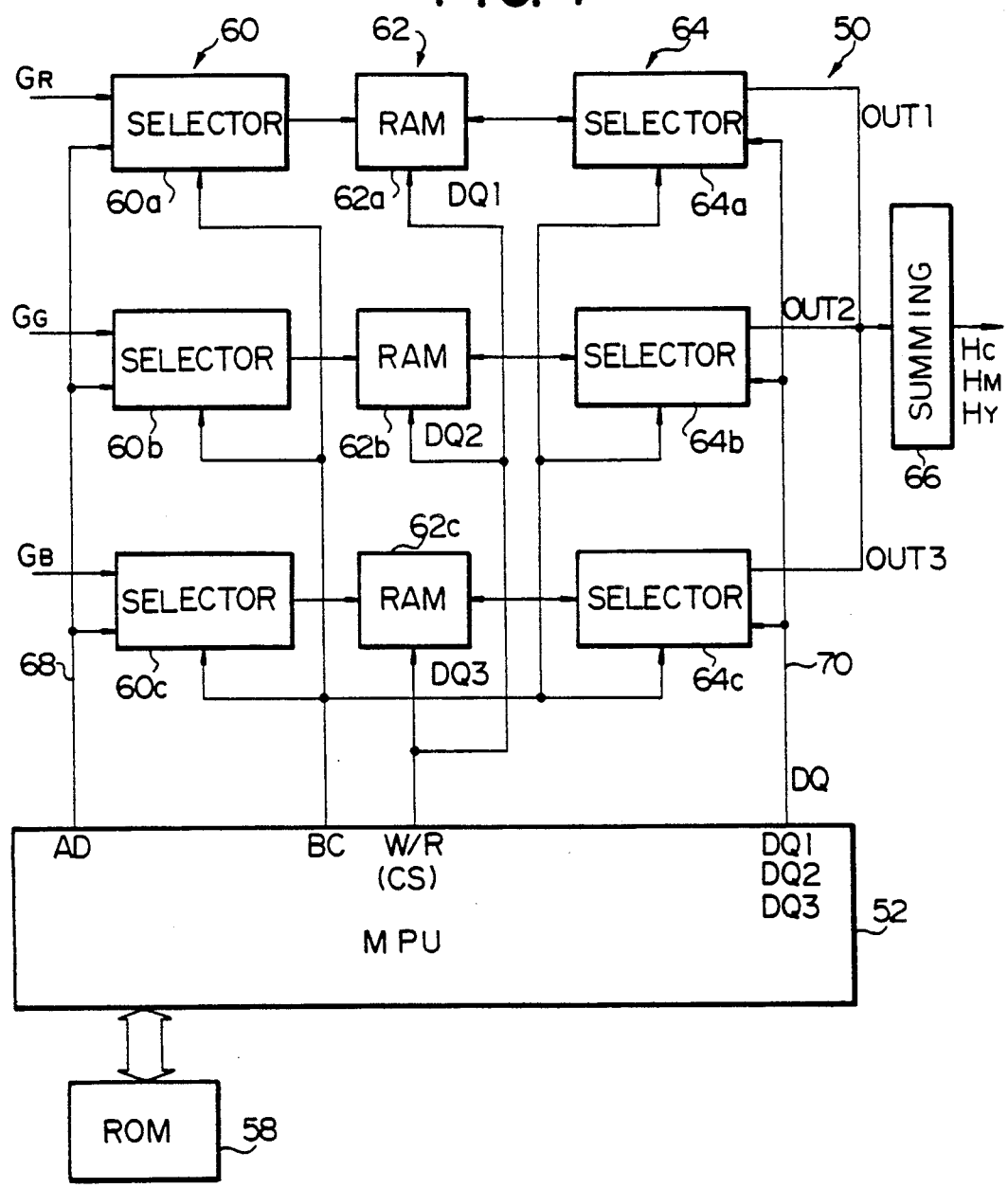
FIG. 4 is a block diagram showing the arrangement of the masking circuit provided in the signal processing system illustrated in FIG. 3.

As illustrated in more detail in FIG. 4, the masking circuit 50 provided in the colored image reading apparatus embodying the present invention largely comprises a first-stage switching network 60, a conversion table network 62, a second-stage switching network 64 and a weighted-parameter summing circuit 66 which are connected in series as shown in FIG. 2.

The first-stage switching network 60 comprises first, second and third selector circuits 60a, 60b and 60c each having signal input terminals responsive to each of the corrected digital color-density signals $G_R$, $G_G$ and $G_B$, respectively, supplied sequentially from the shading amplifier 30. The selector circuits 60a, 60b and 60c further have address input terminals commonly responsive to eight-bit address signals AD supplied from the microprocessor 52 via an address bus 68 and control terminals commonly responsive to a bus control signal BC also supplied from the microprocessor 52.

The conversion table network 62 comprises first, second and third random-access memories 62a, 62b and 62c each having address input terminals connected to each of the first, second and third selector circuits 60a, 60b and 60c of the first-stage switching network 60, respectively. The random-access memories 62a, 62b and 62c (hereinafter referred to simply as memories) further have chip select and write/read control terminals commonly responsive to write/read control and chip select signals W/R and CS supplied from the microprocessor 52. The selector circuits 60a, 60b and 60c are responsive to the bus control signal BC to become transparent to the color-density signal $G_R$, $G_G$ or $G_B$ from the shading generator circuits 30a, 30b and 30c during data read cycle of the memories 62a, 62b and 62c or transparent to the address signal AD supplied from the microprocessor 52 during data write cycle of the memories 62a, 62b and 62c. Thus, when any of the first, second and third selector circuits 60a, 60b and 60c is enabled by the bus control signal BC from the microprocessor 50, either the color-density signal $G_R$, $G_G$ or $G_B$ or the address signal AD selectively input to the particular selector circuit 60a, 60b or 60c is passed through the selector circuit to the associated one of the first, second and third memories 62a, 62b and 62c.

The second-stage switching network 64 comprises first, second and third selector circuits 64a, 64b and 64c each having data input/output terminals connected to data input/-output terminals of each of the first, second and third memories 62a, 62b and 62c, respectively. Each of the selector circuits 64a, 64b and 64c of the second-stage switching network 64 further has data input terminals responsive to data DQ which are to be supplied from the microprocessor 50 via a data bus 70, a control terminal responsive to the bus control signal BC from the microprocessor 52, and data output terminals connected to the summing circuit 66.

Thus, each of the selector circuits 64a, 64b and 64c of the second-stage switching network 64 is responsive to the bus control signal BC to receive quantity-of-ink data DQ from the microprocessor 52 via the data bus 70 and transfer the data DQ to the memories 62a, 62b and 62c to store the data into the memory as quantity-of-ink data DQ1, DQ2 or DQ3, respectively, during a data write cycle of the memories 62a, 62b and 62c, or receive the quantity-of-ink data DQ1, DQ2 and DQ3 from the memories 62a, 62b and 62c and transfer the data DQ1, DQ2 or DQ3 to the summing circuit 66 as its output signals OUT1, OUT2 and OUT3, respectively, during a data read cycle of the memories 62a, 62b and 62c.

The quantity-of-ink data DQ1, DQ2 and DQ3 which the selector circuits 64a, 64b and 64c receive from the memories 62a, 62b and 62c are representative of the quantities $q_C$, quantities $q_M$ or quantities $q_Y$ of the cyanic-, magenta- and yellow-colored inks which correspond to the values represented by the color-density signals $G_R$, $G_G$ and $G_B$. In other words, the quantity-of-ink data DQ1, DQ2 and DQ3 are representative of the quantities $q_C$ of the cyanic-colored ink which are preselected for the values represented by the color-density signals $G_R$, $G_G$ and $G_B$, respectively, when the multiplicand parameters $a_{00}$, $a_{01}$ and $a_{02}$ relating to the cyanic print color are referenced. When the multiplicand parameters $a_{10}$, $a_{11}$ and $a_{12}$ relating to the magenta print color are referenced, the quantity-of-ink data DQ1, DQ2 and DQ3 represent the quantities $q_M$ of the magenta-colored ink which are preselected for the values represented by the color-density signals $G_R$, $G_G$ and $G_B$, respectively. When the parameters $a_{20}$, $a_{21}$ and $a_{22}$ which relate to the yellow print color are referenced, the quantity-of-ink data DQ1, DQ2 and DQ3 represent the quantities $q_Y$ of the yellow-colored ink which are preselected for the values represented by the color-density signals $G_R$, $G_G$ and $G_B$, respectively. As will be described in more detail, the multiplicand parameters $a_{00}$ to $a_{22}$ are prescribed to enable reproduction of images with particular hues which are preferential over images of other hues.

The multiplicand parameters $a_{00}$ to $a_{22}$ are available in a total of seven different versions which consist of six optional versions each including a set of parameters $a_{00}$ to $a_{22}$ (generally represented by $(a_{ij})k$) prescribed for a particular color and additionally a standard version consisting of a set of parameters $a_{00}$ to $a_{22}$ (specifically represented by $(a_{ij})s$) prescribed in accordance with the previously presented Equation 1. In the read-only memory 58 are thus stored a total of seven sets of parameters $a_{00}$ to $a_{22}$ to allow the microprocessor 52, or the operator of the apparatus, to select any one of the seven sets of parameters $a_{00}$ to $a_{22}$. The microprocessor 52 is thus capable of generating seven different versions of quantity-of-ink data DQ depending on the color determined to be predominant over the image to be reproduced.

Each of the quantities $q_C$, $q_M$ or $q_Y$ of the cyanic-, magenta- or yellow-colored ink which may be represented by the data DQ1, DQ2 and DQ3 included in the data DQ output from the microprocessor 52 and loaded into the memories 62a, 62b and 62c is the function of the value represented by the digital color-density signal $G_R$, $G_G$ or $G_B$ supplied to the masking circuit 50. The quantity $q_C$, $q_M$ or $q_Y$ is calculated in accordance with the following determinant:

$$\begin{vmatrix} q_C \\ q_M \\ q_Y \end{vmatrix} = \begin{vmatrix} a_{00}, a_{01}, a_{02}G_R \\ a_{10}, a_{11}, a_{12}G_G \\ a_{20}, a_{21}, a_{22}G_B \end{vmatrix} \qquad \text{Eq. 2}$$

Of the parameters $a_{00}$ to $a_{22}$ stored in the memory 58, the parameters $a_{00}$ to $a_{02}$ are determined by the spectral reflectance and printing characteristics of the cyanic-colored ink, the parameters $a_{10}$ to $a_{12}$ are determined by the spectral reflectance and printing characteristics of the magenta-colored ink, and the parameters $a_{20}$ to $a_{22}$ are determined by the spectral reflectance and printing characteristics of the yellow-colored ink.

In respect of the quantities $q_C$ of the cyanic-colored ink, the values of the products of multiplication $a_{00}*G_R$ in respect of various possible values of the red-color color-density signal $G_R$ are calculated and output by the microprocessor 52 and are stored as the quantity-of-ink data DQ1 into the first memory 62a. The values of the products of multiplication $a_{01}*G_G$ in respect of various possible values of the green-color color-density signal $G_G$ are calculated and output by the microprocessor 52 and are stored as the quantity-of-ink data DQ2 into the second memory 62b. The values representative of the products of multiplication $a_{02}*G_B$ in respect of various possible values of the blue-color color-density signal $G_B$ are calculated and output as the quantity-of-ink data DQ by the microprocessor 52 and are stored as the quantity-of-ink data DQ3 into the third memory 62c.

In respect of the quantities $q_M$ of the magenta-colored ink, the values of the products of multiplication $a_{10}*G_R$, $a_{11}*G_G$ and $a_{12}*G_B$ in respect of the various possible values of the red-, green- and blue-color light-intensity signals $G_R$, $G_G$ and $G_B$ are calculated and output as the quantity-of-ink data DQ by the microprocessor 52 and are stored as the quantity-of-ink data DQ1, DQ2 and DQ3 into the first, second and third memories 62a, 62b and 62c, respectively. In respect of the quantities $q_Y$ of the yellow-colored ink, the values representative of the products of multiplication $a_{20}*G_R$, $a_{21}*G_G$ and $a_{22}*G_B$ in respect of the various possible values of the red-, green- and blue-color color-density signals $G_R$, $G_G$ and $G_B$ are also calculated and output by the microprocessor 52 and are stored as the quantity-of-ink data DQ1, DQ2 and DQ3 into the first, second and third memories 62a, 62b and 62c, respectively.

The quantity-of-ink data DQ1, DQ2 and DQ3 are loaded into the first, second or third memories 62a, 62b and 62c, respectively, during data write cycle of the memory and is later fetched from the memory 62a, 62b or 62c, respectively, during data read cycle of the memory, as will be described in more detail.

Figure 3:
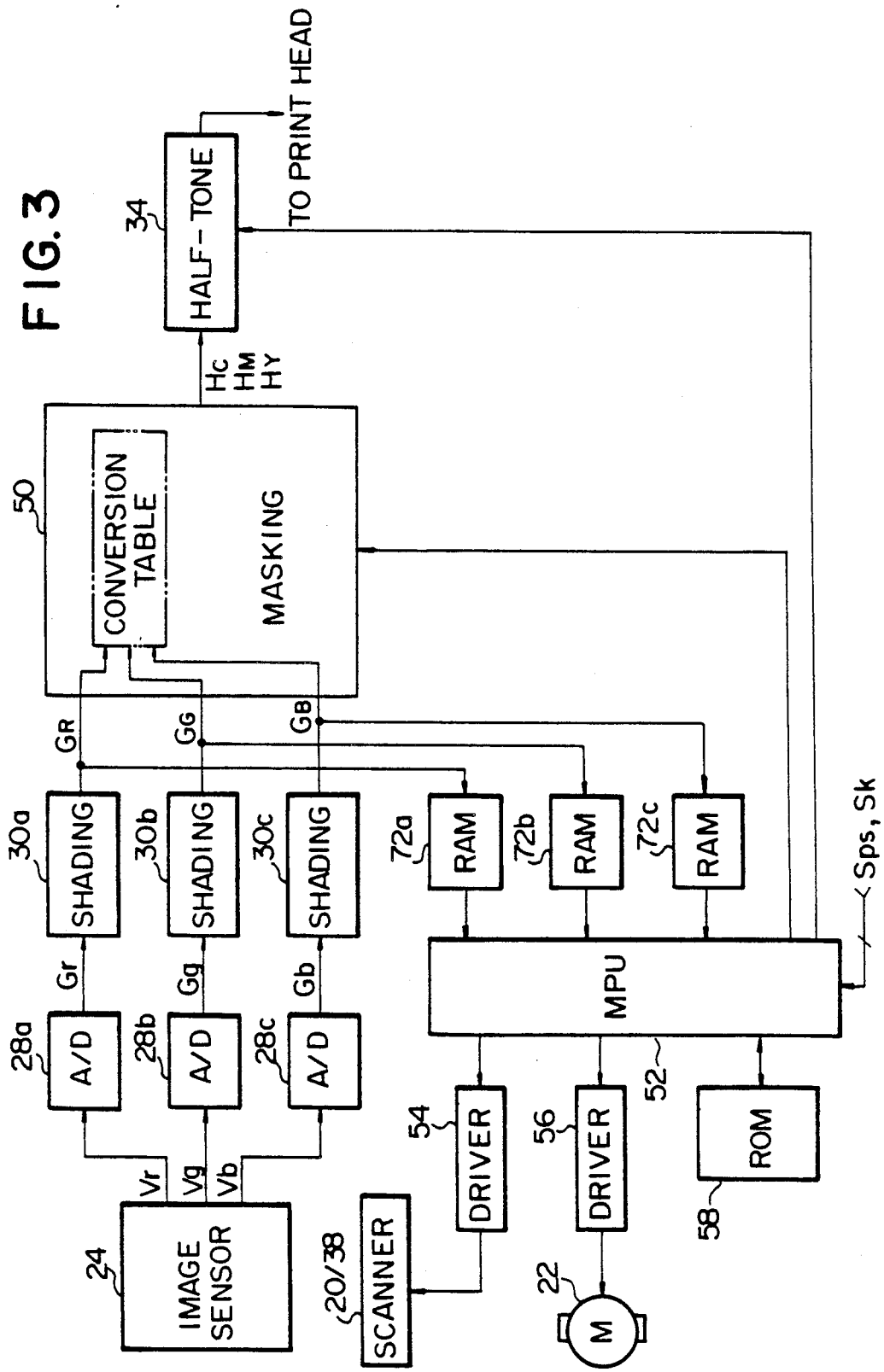
FIG. 3 is a block diagram showing the general construction and arrangement of the signal processing system of a colored image reading apparatus embodying the present invention.

In the embodiment illustrated in FIG. 3, the signal output from the image sensor is per se not subjected to logarithmic conversion unlike the prior-art arrangement shown in FIG. 1 and is supplied directly to the analog-to-digital converters and is thereafter converted into logarithmic values in the masking circuit 50. Thus, the multiplicand parameters used in the embodiment of the present invention are essentially equivalent to those resulting from the logarithmic conversion of the signal from the image sensor as in the prior-art arrangement.

Figure 5:
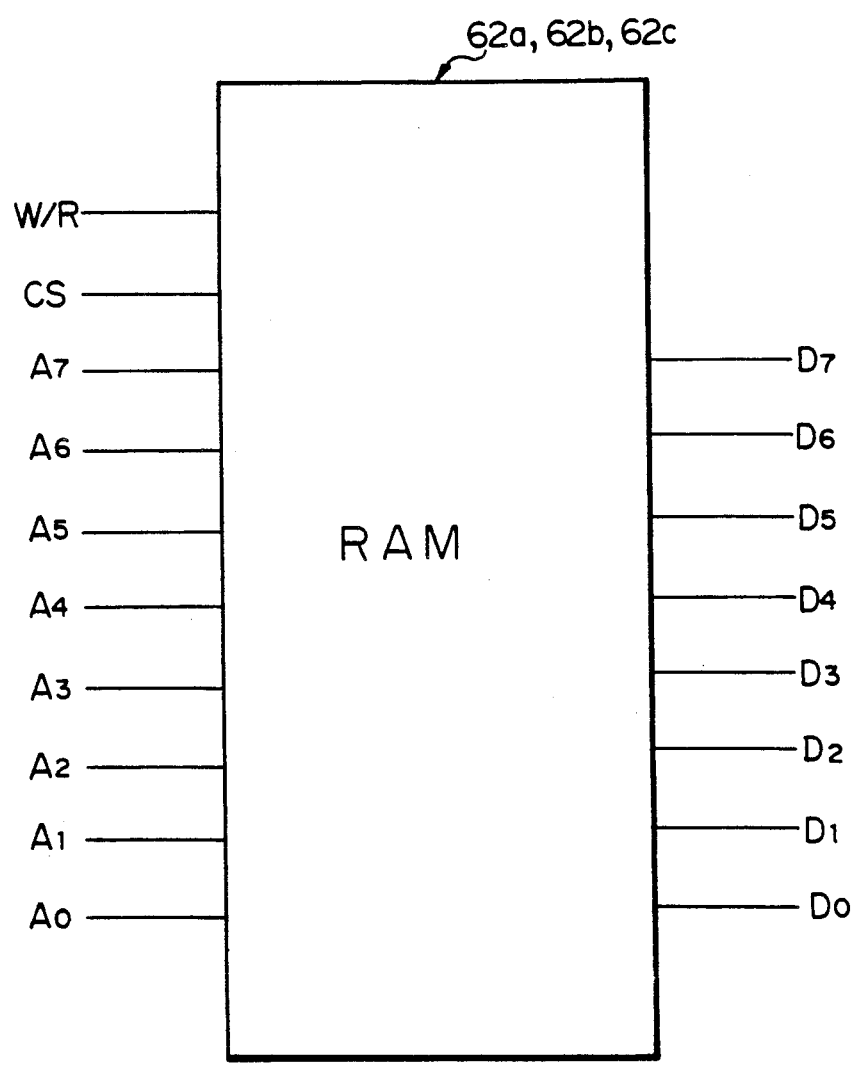
FIG. 5 is a schematic plan view showing the arrangement of terminals or pins of each of the random-access memories included in the masking circuit illustrated in FIG. 4.

Turning to FIG. 5, each of the first, second and third memories 52a, 62b and 62c included in the masking circuit 50 as hereinbefore described has eight address input terminals $A_0$ to $A_7$, eight data input/output terminals $D_0$ to $D_7$, a chip select terminal CS and a write-/read control terminal W/R. At the chip select and write-read control terminals CS and W/R are to be received the chip select and write-read control signals CS and W/R from the corresponding output ports of the microprocessor 52.

At the address input terminals $A_0$ to $A_7$ of each the memories 62a, 62b and 62c is to be received either the eight-bit digital color-density signal $G_R$, $G_G$ or $G_B$ from the shading generator circuits 30a, 30b and 30c (FIG. 3) or the address signal AD from the microprocessor 52 (FIG. 4) through the selectors 60a, 60b and 60c of the first stage switching network 60. Whether the color-density signals $G_R$, $G_G$ and $G_B$ or the address signal AD is to be received is determined by the microprocessor 52 which supplies the bus control signal BC to the selectors 60a, 60b and 60c.

The memory 62a, 62b or 62c, when enabled to operate in a data read cycle by the write/read control signal W/R from the microprocessor 52, receives the color-density signal $G_R$, $G_G$ or $G_B$ through the address input terminals $A_0$ to $A_7$ of the memory and outputs the quantity-of-ink data DQ1, DQ2 or DQ3 at the address represented by the signal $G_R$, $G_G$ or $G_B$ and supplied from the data input/output terminals $D_0$ to $D_7$. The quantity-of-ink data DQ1, DQ2 and DQ3 thus output from the memories 62a, 62b and 62c are supplied through the selectors 64a, 64b or 64c of the second-stage switching network 64 to the weighted-parameter summing circuit 66.

On the other hand, when the memories 62a, 62b and 62c are enabled to operate in a data write cycle by the write/read control signal W/R address signal AD from the microprocessor 52, the address signan AD is supplied to the address input terminals $A_0$ to $A_7$ through the address bus 68. In this instance, the quantity-of-ink data DQ is generated by the microprocessor 52 on the basis of the selected set of parameters $a_{00}$ to $a_{22}$ fetched from the read-only memory 58 and is supplied from the microprocessor 52 to the memories 62a, 62b and 62c through the data bus 70 and the associated selectors 64a, 64b and 64c of the second-stage switching network 64. The quantity-of-ink data DQ is loaded as the quantity-of-ink data DQ1, DQ2 and DQ3 into the memories through the data input/output terminals $D_0$ to $D_7$ of each of the memories and is stored at the address designated by the address signal AD.

In the following table is indicated an example of the set of quantity-of-ink data DQ thus generated by the microprocessor 52 and stored as the quantity-of-ink data DQ1, DQ2 and DQ3 into the memories 62a, 62b and 62c, respectively. The data DQ1, DQ2 and DQ3 are stored into the memories 62a, 62b and 62c, respectively, at a total of 256 addresses designated by bit sequences "00000000" to "11111111" in each of the memories 62a, 62b and 62c. The addresses to be accessed in the memories 62a, 62b and 62c are designated by the digital color-density signals $G_R$, $G_G$ and $G_B$ supplied to the memories 62a, 62b and 62c, respectively, or by the address signal AD supplied to each of the memories 62a, 62b and 62c.

It may be noted that the quantity-of-ink data DQ herein tabulated are those formulated in respect of the parameter $a_{00}$, in particular, which is herein assumed to be given by the bit sequence "10110010". A total of 256 pieces of quantity-of-ink data DQ are thus provided in respect of the parameter $a_{00}$ by the combination of the bit sequence "10110010" and the 256 addresses designated by the bit sequences "00000000" to "11111111" for each of the memories 62a, 62b and 62c.

| Address | Data |
|---|---|
| 00000000 | 00000000 |
| 00000001 | 00000000 |
| 00000010 | 00000001 |
| . | . |
| 00010000 | 00001011 |
| 00010001 | 00001100 |
| . | . |
| 11111111 | 10110001 |

It may be herein noted that the data to be loaded as each of the data DQ1, DQ2 and DQ3 into each of the memories 62a, 62b and 62c, respectively, is composed of the upper eight bits of a 16-bit sequence indicative of the product of multiplication.

A set of table data similar to those tabulated above is generated by the microprocessor 52 for each of the three parameters $a_{00}$, $a_{01}$ and $a_{02}$ relating to the cyanic print color, each of the three parameters $a_{10}$, $a_{11}$ and $a_{12}$ relating to the magenta print color, and each of the three parameters $a_{20}$, $a_{21}$ and $a_{22}$ relating to the yellow print color. Prior to the first cycle of reciprocating movement which the image scanner 20/38 makes for a single document sheet D, the three sets of table data relating to the quantities of cyanic-colored ink are generated by the microprocessor 52 on the basis of the parameters $a_{00}$ to $a_{02}$ fetched from the memory 58 and are supplied through the data bus 70 and the selectors 64a, 64b and 64c to the data input/output terminals $D_0$ to $D_7$ of the memories 62a, 62b and 62c, respectively. On the backward stroke of the image scanner 20/38, the three sets of table data relating to the quantities of magenta-colored ink are generated by the microprocessor 52 on the basis of the parameters $a_{10}$ to $a_{12}$ fetched from the memory 58 and are supplied through the data bus 70 and the selectors 64a, 64b and 64c to the data input/output terminals $D_0$ to $D_7$ of the memories 62a, 62b and 62c, respectively. Likewise, on the backward stroke of the image scanner 20/38, the three sets of table data relating to the quantities of yellow-colored ink are generated by the microprocessor 52 on the basis of the parameters $a_{20}$ to $a_{22}$ fetched from the memory 58 and are supplied through the data bus 70 and the selectors 64a, 64b and 64c to the data input/output terminals $D_0$ to $D_7$ of the memories 62a, 62b and 62c, respectively.

On the forward stroke of the image scanner 20/38 for a given document sheet D during the first cycle of printing operation, three pieces of data indicating particular quantities of cyanic-colored ink are fetched from the memories 62a, 62b and 62c, respectively, at the addresses represented by the color-density signals $G_R$, $G_G$ and $G_B$, respectively, supplied to the address input terminals $A_0$ to $A_7$ of the memories 62a, 62b and 62c, respectively. These pieces of data are output as the quantity-of-ink data DQ1 ($=a_{00}*G_R$), DQ2 ($=a_{01}*G_G$) and DQ3 ($=a_{02}*G_B$) from the data input/output terminals $D_0$ to $D_7$ of the memories 62a, 62b and 62c, respectively, and are supplied as the output signals OUT1, OUT2 and OUT3, respectively, to the summing circuit 66. By the summing circuit 66 is produced the signal $H_C$ indicative of the quantity $Q_C$ of the cyanic-colored ink to be ejected from the cyanic ink-jet nozzle of the print head. Thus, the signal $H_C$ is produced on the forward stroke of the image scanner 20/38 during the first cycle of printing operation.

On the forward stroke of the image scanner 20/38 for the given document sheet D during the second cycle of printing operation, three pieces of data indicating particular quantities of magenta-colored ink are fetched from the memories 62a, 62b and 62c, respectively, at the addresses represented by the color-density signals $G_R$, $G_G$ and $G_B$, respectively. These pieces of data are output as the quantity-of-ink data DQ1 ($=a_{10}*G_R$), DQ2 ($=a_{11}*G_G$) and DQ3 ($=a_{12}*G_B$) from the memories 62a, 62b and 62c, respectively, and are supplied as the output signals OUT1, OUT2 and OUT3, respectively, to the summing circuit 66. By the summing circuit 66 is produced the signal $H_M$ indicative of the quantity $Q_M$ of the magenta-colored ink to be ejected from the magenta ink-jet nozzle of the print head. The signal $H_M$ is thus produced on the forward stroke of the image scanner 20/38 during the second cycle of printing operation.

On the forward stroke of the image scanner 20/38 for for the same document sheet D during the third cycle of printing operation, three pieces of data indicating particular quantities of yellow-colored ink are fetched from the memories 62a, 62b and 62c, respectively, at the addresses represented by the color-density signals $G_R$, $G_G$ and $G_B$, respectively. These pieces of data are output as the quantity-of-ink data DQ1 ($=a_{20}*G_R$), DQ2 ($=a_{21}*G_G$) and DQ3 ($=a_{22}*G_b$) from the memories 62a, 62b and 62c, respectively, and are supplied as the output signals OUT1, OUT2 and OUT3, respectively, to the summing circuit 66. By the summing circuit 66 is now produced the signal $H_M$ indicative of the quantity $Q_Y$ of the yellow-colored ink to be ejected from the magenta ink-jet nozzle of the print head. The signal $H_Y$ is thus produced on the forward stroke of the image scanner 20/38 during the third cycle of printing operation.

As has been described, the three sets of table data relating to the quantities of cyanic-, magenta- or yellow-colored ink are generated by the microprocessor 52 on the basis of the parameters $a_{00}$ to $a_{02}$, $a_{10}$ to $a_{12}$ or $a_{20}$ to $a_{22}$ fetched from the memory 58 and are stored into the memories 62a, 62b and 62c, respectively, on the forward stroke of the scanner 20/38 during each of the three cycles of printing operation for a single document sheet D. If desired, arrangements may be made so that the three sets of table data relating to the quantities $q_c$, $q_M$ and $q_Y$ of the cyanic-, magenta- and yellow-colored inks are generated by the microprocessor 52 and stored into each of the memories 62a, 62b and 62c before the image scanner 20/38 starts the three cycles of reciprocating movement. In this instance, the three memories 62a, 62b and 62c forming the conversion table network 62 is required to have a total data storage area capable of accommodating 9×256 bytes of data although only 3×256 bytes of data are used during each cycle of reciprocating movement of the image scanner 20/38. This means that one third of the data stored in the total data storage area of the conversion table network 62 is left unused throughout each step of scanning operation and further that one third of the total data storage area of the conversion table network 62 is even surplus. Such a waste of the data storage area of the conversion table network 62 can be effectively avoided in the signal processing system of the apparatus embodying the present invention in which the three sets of table data relating to the quantities of ink are stored into the memories 62a, 62b and 62c, respectively, during each of the three steps of scanning operation. The storage of these data into the memories 62a, 62b and 62c is effected during the later half of each cycle of reciprocating movement of the image scanner 20/38 which is on the stroke of returning to its home position.

As has been described, the quantity-of-ink data DQ1, DQ2 and DQ3 fetched from the memories 62a, 62b and 62c are supplied as the output signals OUT1, OUT2 and OUT3, respectively, of the selectors 64a, 64b and 64c of the second-stage switching network 64 to the weighted-parameter summing circuit 66. The numerical values represented by these signals OUT1, OUT2 and OUT3 are summed up to produce the signal $H_C$, $H_M$ or $H_Y$ indicative of the quantity $q_C$, $q_M$ or $q_Y$ of the cyanic-, magenta- or yellow-colored ink to be used for the reproduction of the images represented by the supplied signals $G_R$, $G_G$ and $G_B$, respectively. The signals $H_M$, $H_Y$ and $H_C$ thus output from the masking circuit 50 are supplied to the half-tone generator circuit 34, from which the dither-processed signals produced from the supplied digital signals $H_M$, $H_Y$ and $H_C$ are supplied to the driver circuits for the print head to control the quantities $q_C$, $q_M$ or $q_Y$ of the cyanic-, magenta-, or yellow-colored inks to be ejected from the print head.

As in the masking circuit 32 of the prior-art colored image reading apparatus hereinbefore described, the multiplicand parameters $a_{00}$ to $a_{22}$ used in formulating the quantity-of-ink data DQ on the basis of the selected set of parameters $a_{00}$ to $a_{22}$ stored in the read-only memory 58 are determined to enable reproduction of images of particular hues preferentially over images of other hues. In the masking circuit 54 of the signal processing system of the apparatus embodying the present invention, these parameters are prescribed such that the pixels printed on the basis of the signals output from the masking circuit 54 have color tone characteristics which are as close to those of given sample colors as possible. For this purpose, the parameters $a_{00}$ to $a_{22}$ used in the masking circuit 54 are determined so that the value $\Delta E^2$ given by the following equation is minimized:

$$\Delta E^2 = \Sigma W_k(L_k^* - L_k^{*\prime})^2 + (a_k^8 - a_k^{*\prime})^2 + {}^2 + (a_k^* - a_k^{*\prime})^2 + (b_k^* - b_k^{*\prime})^2 \quad \text{Eq. 3}$$

where $L_k^*$, $a_k^*$ and $b_k^*$ are values specific to a given sample color exhibits in the uniform color space ($L_k^*$, $a_k^*$, $b_k^*$) and $L_k^{*\prime}$, $a_k^{*\prime}$ and $b_k^{*\prime}$ are values indicative of the attributes of the corresponding color in which pixels are printed. The subscript "k" is representative of the number allocated to an n number of different sample colors each representative of a limited range of hues and is thus an integer variable from "1" to "n".

The multiplicand parameters $a_{00}$ to $a_{22}$ are prescribed in respect of a color such as blue having a specific range of hues so that, when determined in accordance with Equation 3, the difference in chromaticity between the color of an original image having the particular range of hues and the corresponding color in which the original image is reproduced becomes less than that for other colors. In the following description, the set of parameters selected in respect of the kth sample color will be designated $(a_{ij})k$. Thus, a total of six "optional" sets of multiplicand parameters $(a_{ij})1$ to $(a_{ij})6$ are available in the colored image reading apparatus embodying the present invention in respect of the six different colors consisting of red, green, blue, cyan, nagenta and yellow, respectively, and are stored in the read-only memory 58.

During printing operation of the colored image reading apparatus embodying the present invention, any one of the six optional sets of multiplicand parameters $a_{00}$ to $a_{22}$ may be selected and the data representative of the selected set of parameters fetched from the memory 58 by the microprocessor 52. The microprocessor 52 then generates the quantity-of-ink data DQ on the basis of the parameters $a_{00}$ to $a_{22}$ represented by the data thus fetched from the memory 58. The selection of one of the six optional sets of parameters $a_{00}$ to $a_{22}$ is effected by the microprocessor 52 during preliminary document scanning mode of operation or by the operator of the apparatus prior to the start of a cycle of printing operation for a given document sheet as will be described.

The read-only memory 58 for storing the six optional sets of multiplicand parameters $a_{00}$ to $a_{22}$ may have a relatively small storage capacity of at least six bytes. If the quantity-of-ink data DQ generated for the six optional sets of parameters $(a_{ij})1$ to $(a_{ij})6$ were to be stored in a read-only memory, the memory would be required to be capable of storing $2^8 \times 6 = 1.5$ byte of data for each set of parameters $(a_{ij})k$. The use of a read-only memory of such a large storage capacity is avoided in the signal processing system in which only the six optional sets of parameters $a_{00}$ to $a_{22}$ are stored in the memory 58.

To enable the microproseccor 52 to select any of the six optional sets of parameters $a_{00}$ to $a_{22}$, the signal processing system of the apparatus embodying the present invention further comprises first, second and third line memories 72a, 72b and 72c each implemented by a random-access memory, as illustrated in FIG. 3. These first, second and third line memories 72a, 72b and 72c have input ports connected to the first, second and third shading generator circuits 30a, 30b and 30c, respectively. Thus, the corrected digital color-density signals $G_R$, $G_G$ and $G_B$ output from the shading generator circuits 30a, 30b and 30c are transferred not only to the masking circuit 50 as previously noted but also to the line memories 72a, 72b and 72c, respectively. The digital color-density signals $G_R$, $G_G$ and $G_B$ thus stored into the line memories 72a, 72b and 72c are released to the data input/output port of the microprocessor 52.

The operator of the apparatus desiring to produce a duplicate of the document sheet D bearing multi-colored images may select a preliminary document scanning mode of operation (hereinafter referred to simply as pre-scan mode of operation) before the operator requests the apparatus to start printing operation for the document sheet D. The pre-scan mode of operation can be selected through manipulation of a pre-scan select key which is provided on the control panel (not shown) of the apparatus in addition to the print start key to be used to quest the apparatus to start a cycle of printing operation through actual scanning of the document sheet D.

When the pre-scan mode of operation is thus manually selected on the control panel of the apparatus, a pre-scan mode select signal $S_{PS}$ is produced and is supplied to the microprocessor 52. The microprocessor 52 in receipt of this pre-scan mode select signal $S_{PS}$ outputs a command signal prohibiting the print head from starting operation while activating the drivers 54 and 56 for the image scanner 20/38 and scanner drive motor 22.

With the drivers 54 and 56 for the image scanner 20/38 and scanner drive motor 22 thus activated, the image-bearing face of the document sheet D is scanned by the beam of light emitted from the illuminating lamp 20 and an information-carrying beam of light is incident on the light receiving face of the image sensor 24. As the document sheet D is thus scanned by the image scanner 20/38, the image sensor 24 produces the voltage signals $V_r$, $V_g$ and $V_b$ representing the intensities of the red, green and blue components, respectively, of the light incident on the image sensor 24. These analog color-density signals $V_r$, $V_g$ and $V_b$ are supplied to the analog-to-digital converters 28a, 28b and 28c and are thereby converted into corresponding eight-bit digital signals $G_r$, $G_g$ and $G_b$, respectively. The digital color-density signals $G_r$, $G_g$ and $G_b$ thus output from the analog-to-digital converters 28a, 28b and 28c are supplied to the shading generator circuits 30a, 30b and 30c, respectively, and are thereby corrected into signals $G_R$, $G_G$ and $G_B$. The digital color-density signals $G_R$, $G_G$ and $G_B$ are transferred not only to the masking circuit 50 but through the line memories 72a, 72b and 72c, respectively, to the microprocessor 52.

In response to the digital color-density signals $G_R$, $G_G$ and $G_B$, the microprocessor 52 generates data to represent a histogram in respect of the colors contained in the multi-colored image read from the scanned document sheet D and, on the basis of the histogram, detects the color most "predominant" over the multi-colored image on the scanned document sheet D. Depending on the color thus determined to be predominant over the multi-colored image on the scanned document sheet D, the microprocessor 52 determines which of the six optional sets of multiplicand parameters $a_{00}$ to $a_{22}$ is to be selected for use in generating the quantity-of-ink data DQ for the reproduction of the detected images.

Figure 6:
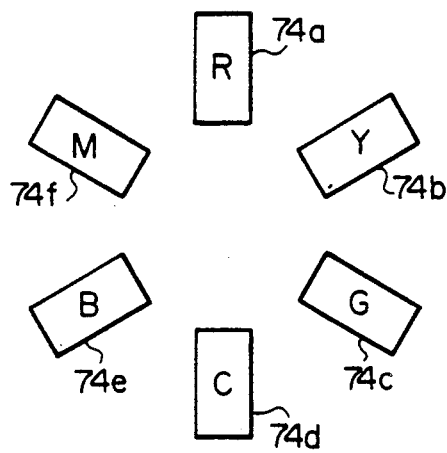
FIG. 6 is a plan view schematically showing the arrangement of keys provided on a control panel of the apparatus embodying the present invention for allowing the operator of the apparatus to select any of a plurality of sets of fixed parameters to be used in formulating the quantity-of-ink data in the signal processing system illustrated in FIG. 3.
Figure 7:
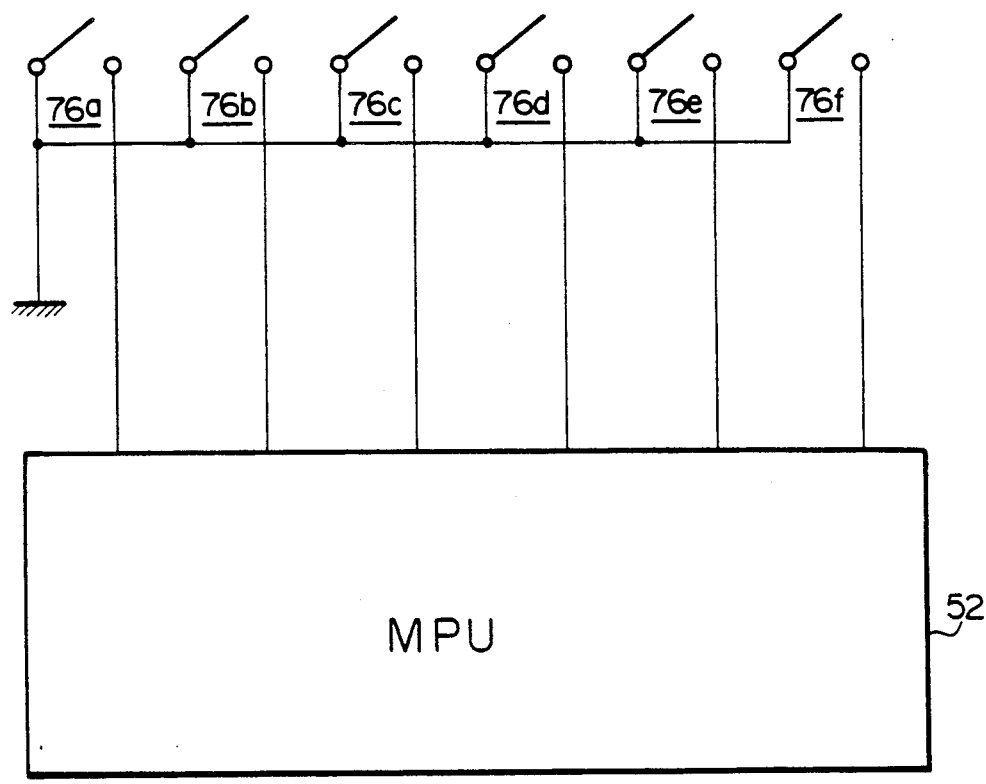
FIG. 7 is a circuit diagram showing the switch arrangement associated with the keys illustrated in FIG. 6 and forming part of the signal processing system illustrated in FIG. 3.

The selection of one of the six optional sets of parameters $a_{00}$ to $a_{22}$ can be effected either by means of the microprocessor 52 during pre-scan mode of operation as hereinbefore described or by the operator of the apparatus prior to the start of a cycle of printing operation for a given document sheet. To enable the operator of the apparatus to select any one of the six optional sets of parameters $a_{00}$ to $a_{22}$, the control panel of the colored image reading apparatus embodying the present invention has arranged thereon a total of six keys 74a, 74b, 74c, 74d, 74e and 74f allocated to red (R), yellow (Y), green (G), cyan (C), blue (B) and magenta (M), respectively, as shown in FIG. 6. Through manipulation of any of these keys 74a to 74f, the operator of the apparatus may select any desired one of the six optional sets of parameters $a_{00}$ to $a_{22}$ available in the memory 58. As illustrated in FIG. 7, each of these six keys 74a to 74f provided on the control panel of the apparatus forms part of or is associated with each of six normally-open switches 76a to 76f, respectively, which are connected to input ports of the microprocessor 52. With any one of the keys 74a to 74f manipulated by the operator of the apparatus prior to the start of a cycle of printing operation, a signal $S_k$ allocated to one of the six optional sets of multiplicand parameters $a_{00}$ to $a_{22}$. The signal $S_k$ is also supplied to the microprocessor 52 of the signal processing system shown in FIG. 3 and enables the microprocessor 52 to select the particular one of the six optional sets of parameters $a_{00}$ to $a_{22}$.

If none of the optional sets of multiplicand parameters is selected by the microprocessor 52 or by the operator of the apparatus, the microprocessor 52 automatically selects the "standard" set of parameters $a_{00}$ to $a_{22}$ (($a_{ij}$)s) prescribed in accordance with the previously presented Equation 1. The "standard" set of parameters ($a_{ij}$)s is selected when neither the pre-scan mode select key nor any of the keys 74a to 74f is manipulated by the operator prior to the start of a cycle of printing operation.

OPERATION OF SIGNAL PROCESSING SYSTEM

Operation of the colored image reading apparatus, particularly, the signal processing system of the apparatus thus constructed and arranged in accordance with the present invention will be hereinafter described with further reference to the flowcharts of FIGS. 8 to 11. The flowcharts of FIGS. 8 to 11 show the major routine and subroutine programs to be executed by the microprocessor 52 included in the signal processing system described with reference to FIGS. 3 to 5.

MAIN ROUTINE PROGRAM

Before the printer apparatus is initiated into a cycle of printing operation, the operator of the apparatus places an original document sheet D on the document support table 36 (FIG. 2) and may then depress either the pre-scan mode select key or the print start key provided on the control panel of the apparatus.

Thus, the microprocessor 52 first detects at step A01 whether or not there is the signal $S_{SP}$ of logic value "1" received with the pre-scan mode select switch depressed. If it is found at step A01 that there is no signal $S_{SP}$ of logic value "1" received and accordingly the answer for this step A01 is given in the negative, the microprocessor 52 proceeds to step A02 to check if there is a signal $S_k$ of logic value "1" received with any one of the keys 74a to 74f depressed. If it is found at this step A02 that there is the signal $S_k$ of logic value "1" received and thus the answer for the step A02 is given in the affirmative, the microprocessor 52 determines that the set of parameters ($a_{ij}$)k indicated by the signal $S_k$ is selected by the operator of the apparatus from among the six optional sets of multiplicand parameters $a_{00}$ to $a_{22}$. In this instance, the microprocessor 52 proceeds to step A03 to select and fetch the particular set of parameters ($a_{ij}$)k from the associated read-only memory 58.

If it is determined at step A02 that there is no signal $S_k$ of logic value "1" received and thus the answer for the step A02 is given in the negative, the microprocessor 52 determines that neither the pre-scan mode of operation has been selected nor any of the keys 72a to 72f has been manipulated by the operator of the apparatus. In this instance, the microprocessor 52 proceeds to step A04 to select and fetch the standard set of parameters ($a_{ij}$)s from the read-only memory 58.

On the other hand, if it is found at step A01 that there is the signal $S_{SP}$ of logic value "1" received with the pre-scan mode select key depressed by the operator and accordingly the answer for this step A01 is given in the negative, the microprocessor 52 proceeds to and executes a pre-scan mode control subroutine program A05. The details of this pre-scan mode control subroutine program A05 are illustrated in FIG. 9.

PRE-SCAN MODE CONTROL SUBROUTINE PROGRAM

Figure 9:
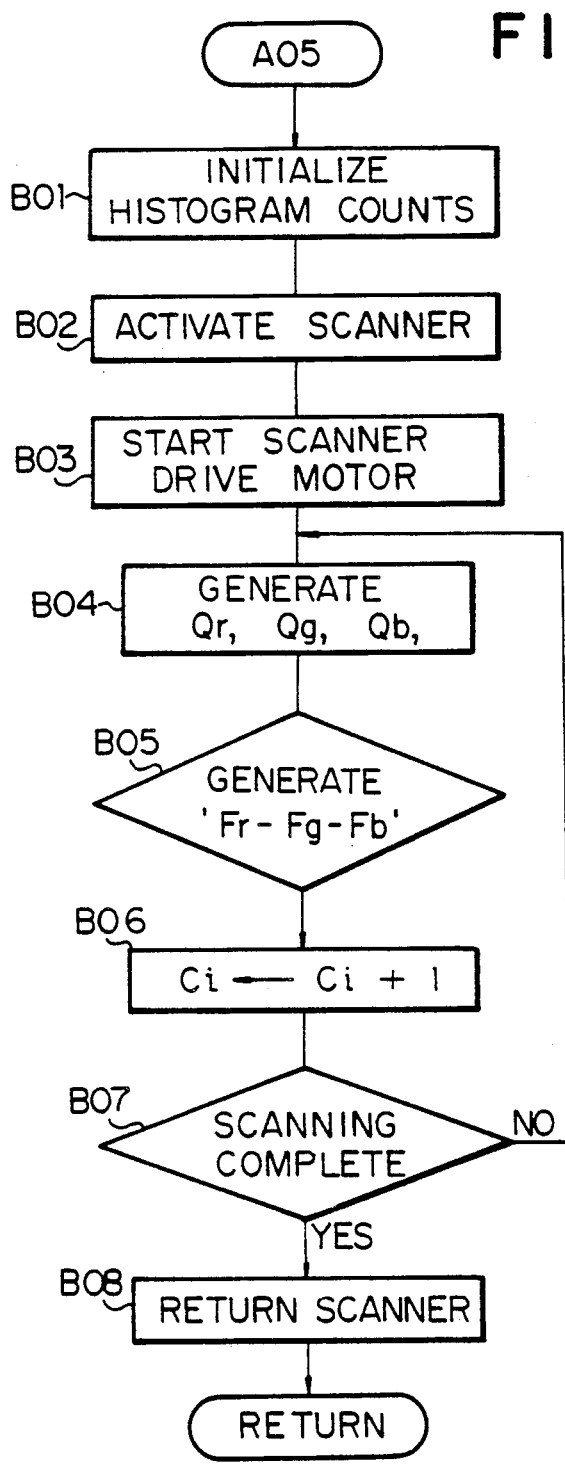
FIG. 9 is a flowchart showing the details of a pre-scan mode control subroutine program included in the main routine program illustrated in FIG. 8.

Referring to FIG. 9, the pre-scan mode control subroutine program A05 starts with a step B01 at which the microprocessor 52 initializes the contents of the data storage areas which the microprocessor 52 has for the formulation of a histogram. The histogram is to be prepared to determine the shares, in terms of number, of the pixels of different colors in the images on the scanned document sheet D and specify the color predominant over the images represented by the signals $G_R$, $G_G$ and $G_B$ produced from the total image area of the document sheet D and supplied to the microprocessor 52. These data storage areas of the microprocessor 52 are respectively assigned to eight predetermined sections of the uniform color space which are herein assumed to be those allocated to white, yellow, magenta, red, cyan, green, blue and black. The data storage areas are used to store data representing the numbers, or histogram counts, of the pixels of the hues determined to fall within the red-color section $R_r$, green-color section $R_g$ and blue-color section $R_b$, respectively, or, generally, the sections $R_i$ of the uniform color space.

The step B01 ia followed by steps B02 and B03 at which the microprocessor 52 outputs a command signal prohibiting the print head from starting operation while activating the drivers 54 and 56 for the image scanner 20/38 and scanner drive motor 22, respectively.

The image scanner 20/38 is now turned on to illuminate the document sheet D and the scanner drive motor 22 put into motion to drive the image scanner 20/38 in the direction of arrow a with respect to the document sheet D. As the document sheet D is thus optically scanned by the image scanner 20/38, the image sensor 24 produces the analog color-density signals $V_r$, $V_g$ and $V_b$ indicating the intensities of light detected from the successive lines of multi-color pixels in the original images. These analog color-density signals $V_r$, $V_g$ and $V_b$ are converted into corresponding eight-bit digital signals $G_r$, $G_g$ and $G_b$ by the analog-to-digital converters 28a, 28b and 28c, respectively. From the digital color-density signals $G_r$, $G_g$ and $G_b$, the corrected color-density signals $G_R$, $G_G$ and $G_B$ are produced by the shading generator circuits 30a, 30b and 30c, respectively, and are transferred to the masking circuit 50 and through the line memories 72a, 72b and 72c, respectively, to the microprocessor 52.

In response to the digital color-density signals $G_R$, $G_G$ and $G_B$, the microprocessor 52 detects the pixels of each of the three different colors, viz., red, green and blue at step B04 in the individual lines of pixels successively scanned by the image scanner 20/38. At this step B04, the microprocessor 52 is further operative to count the number of the detected pixels of each color for each of the lines of pixels and generate data indicating the color densities $Q_r$, $Q_g$ and $Q_b$ of red, green and blue, respectively, in each line of pixels. The microprocessor 52 then proceeds to a series of steps B05 to compare each of the color densities $Q_r$, $Q_g$ and $Q_b$ of red, green and blue, respectively, in the line of pixels with a predetermined threshold value $Q_{TH}$ as graphically indicated in FIG. 12, which is a graphic representation of an example of the color distribution in a line of multi-color pixels detected from the images on the scanned document sheet D.

Figure 12:
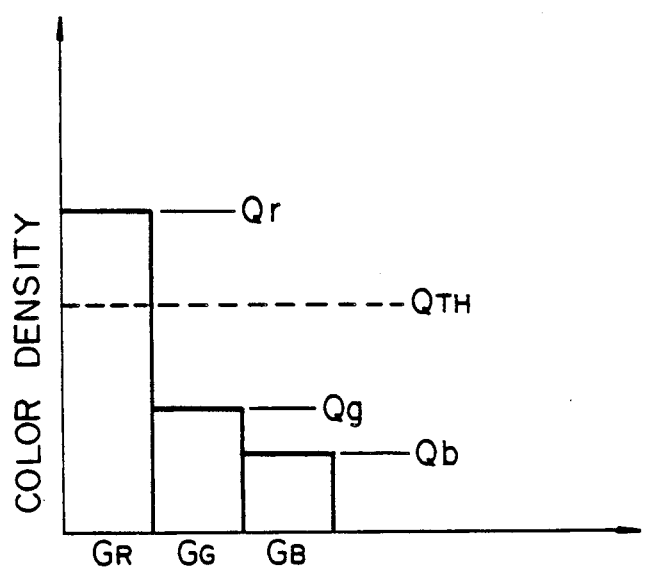
FIG. 12 is a graphic representation of an example of a color distribution in a line of multi-color pixels detected from the images on a scanned document sheet.
Figure 13:
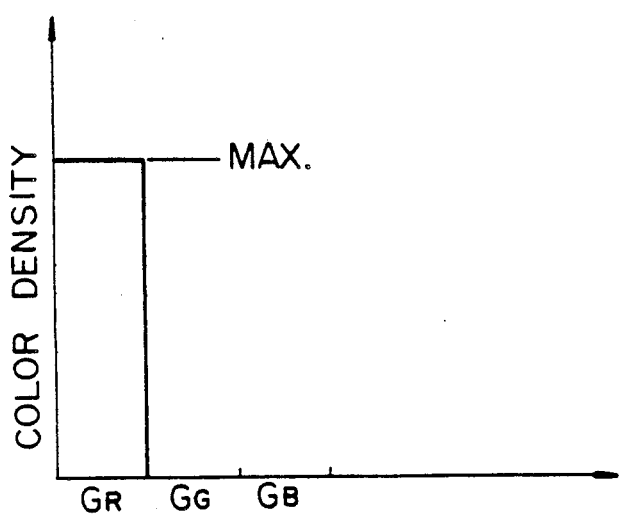
FIG. 13 is a graphic representation of a basic scheme for the logic modification of the color distribution illustrated in FIG. 12.

Thus, if any of the color densities $Q_r$, $Q_g$ and $Q_b$ of the line of pixels under consideration is found to be higher than the predetermined threshold value $Q_{TH}$, a signal $F_r$, $F_g$ or $F_b$ of logic value "1" is set in respect of the particular color density $Q_r$, $Q_g$ or $Q_b$, respectively, in the particular line of pixels. On the other hand, if any of the color densities $Q_r$, $Q_g$ and $Q_b$ of the line of pixels is found to be lower than the predetermined threshold value $Q_{TH}$, the signal $F_r$ is set to logic value "0" is generated in respect of the particular color density $Q_r$, $Q_g$ or $Q_b$, respectively, in the particular line of pixels. In this manner a three-bit sequence "$F_r$-$F_g$-$F_b$" can be generated for the color-density signals $G_R$, $G_G$ and $G_B$ currently supplied to the microprocessor 52. In the case, for example, of the color densities $Q_r$, $Q_g$ and $Q_b$ of red, green and blue, respectively, as indicated in FIG. 12, there is thus obtained a three-bit sequence of "1-0-0" from the color-density signals $G_R$, $G_G$ and $G_B$ currently supplied to the microprocessor 52. This three-bit sequence "1-0-0" indicates that the line of multi-color pixels currently detected from the document sheet D contains red-colored pixels with a maximum density and green-colored and blue-colored pixels with minimum densities as graphically indicated in FIG. 13. FIG. 13 is a graphic representation of a logic modification of the color distribution illustrated in FIG. 12. The pixels forming such a line of pixels must be those of a purity of cyan.

Thus, a total of eight variations of the three-bit sequence "$F_r$-$F_g$-$F_b$" can represent eight different colors as follows:

| Bit Sequence | | | |
|---|---|---|---|
| $F_r$ | $F_g$ | $F_b$ | Representative Color |
| 0 | 0 | 0 | White |
| 0 | 0 | 1 | Yellow |
| 0 | 1 | 0 | Magenta |
| 0 | 1 | 1 | Red |
| 1 | 0 | 0 | Cyan |
| 1 | 0 | 1 | Green |
| 1 | 1 | 0 | Blue |
| 1 | 1 | 1 | Black |

Each of these eight different colors is representative of hues which fall within one of eight predetermined sections $R_i$ of the uniform color space. As will be seen from the above table, these eight predetermined sections $R_i$ of the uniform color space consist of section $R_w$ containing hues represented by white, section $R_y$ containing hues represented by yellow, section $R_m$ containing hues represented by magenta, section $R_r$ containing hues represented by red, section $R_c$ containing hues represented by cyan, section $R_g$ containing hues represented by green, section $R_b$ containing hues represented by blue, section $R_k$ containing hues represented by black.

Thus, a three-bit sequence "$F_r$-$F_g$-$F_b$" having any bit configuration is generated for the currently detected line of pixels and, in addition, it is determined that the color represented by the particular bit sequence falls within which of the sections $R_i$ of the uniform color space. Subsequently to this series of steps B05, the microprocessor 52 proceeds to step B06 to increment the histogram count $C_i$ assigned to the particular section $R_i$ of the color space within which the color represented by the bit sequence currently under consideration falls. The microprocessor 52 thereafter proceeds to step B07 to detect if all the lines of pixels forming the images on the document sheet D have been detected and accordingly the forward movement of the image scanner 20/38 in the current cycle of scanning operation is complete. If the answer for this step B07 is given in the negative, the microprocessor 52 reverts to step B04 and repeats the steps B04, B05 and B06 to detect the pixels of the immediately subsequent line of pixels (step B04), generate the three-bit sequence "$F_r$-$F_g$-$F_b$" for this new line of pixels (steps B05) and increment the histogram count $C_i$ assigned to the section $R_i$ of the color space within which the color represented by the new bit sequence falls (step B06).

The forward movement of the image scanner 20/38 in the current cycle of scanning operation will then become complete with all the lines of pixels forming the images on the document sheet D detected by the image scanner 20/38. The answer for the step B07 is now given in the affirmative so that the microprocessor 52 to activate the driver 56 for the scanner drive motor 22 so that the motor 22 operates in the reverse direction of rotation to drive the image scanner 20/38 to return toward its home position in the direction of arrow a' (FIG. 2).

Figure 14:
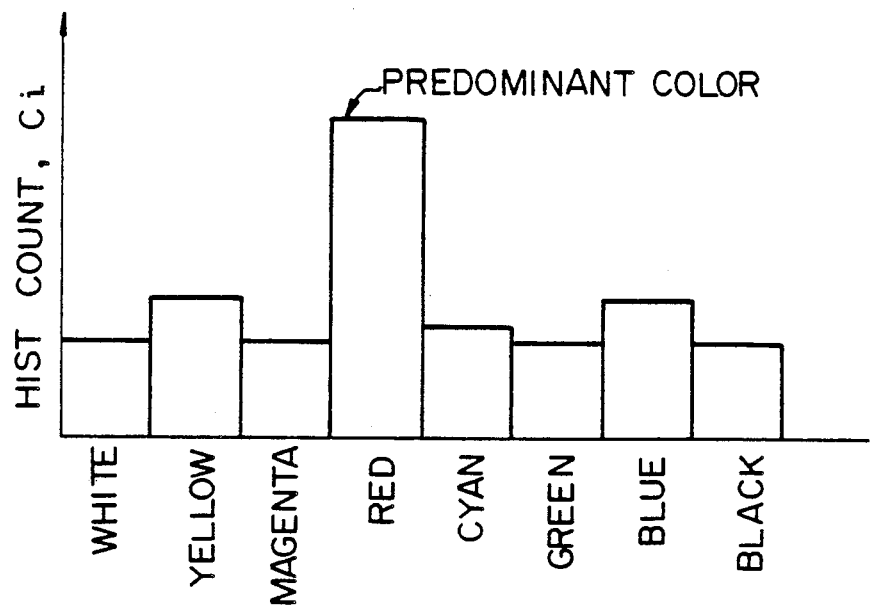
FIG. 14 is a histogram showing the counts indicative of the respective proportions of different colors of all the pixels detected from the images on a scanned document sheet.

Through repeated execution of loop composed of the steps B04 to B07, there is generated a collection of data representing a color histogram showing the counts $C_i$ indicative of the proportions of the eight different colors falling within the sections $R_i$ of the uniform color space. An example of such a histogram is illustrated in FIG. 14, from which it will be seen that red in particular is determined to appear most frequently in the images on the scanned document sheet D. The color thus determined to appear most frequently in the color histogram generated for a given document sheet is deemed "predominant" over the images on the scanned document sheet D.

Figure 8:
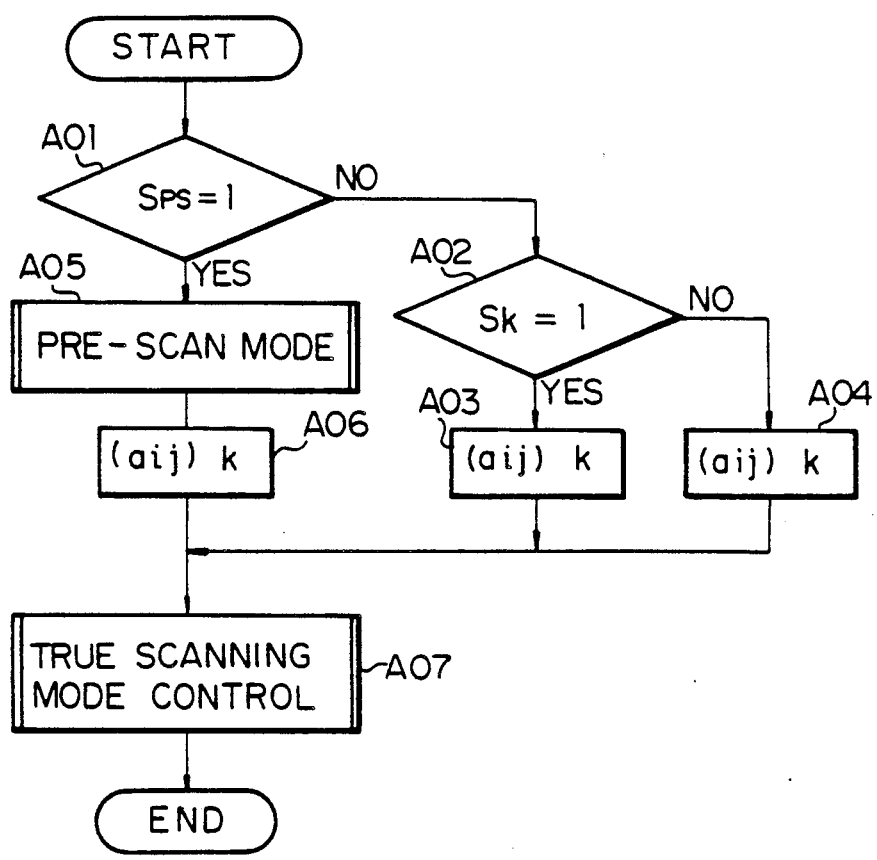
FIG. 8 is a flowchart showing an example of a main routine program to be executed by the microprocessor incorporated in the masking circuit illustrated in FIG. 4.

Upon termination of the subroutine program A05, the microprocessor 52 returns to the main routine program illustrated in FIG. 8 and proceeds to step A06 of the main routine program. At this step A06, the microprocessor 52 selects and fetches from the associated read-only memory 58 the set of multiplicand parameters $(a_{ij})k$ particularly assigned to the color of the number k determined to be predominant over the multi-colored image on the scanned document sheet D.

After any one of the optional sets of multiplicand parameters $(a_{ij})k$ is selected at step A03 or step A06 or the standard set of parameters $(a_{ij})s$ is selected at step A04 for use in generating the quantity-of-ink data DQ for the reproduction of the detected images, the microprocessor 52 proceeds to and executes "true" scan mode control subroutine program A07. The details of this true scan mode control subroutine program A07 will be hereinafter described with reference to FIGS. 10A and 10B.

Figure 15:
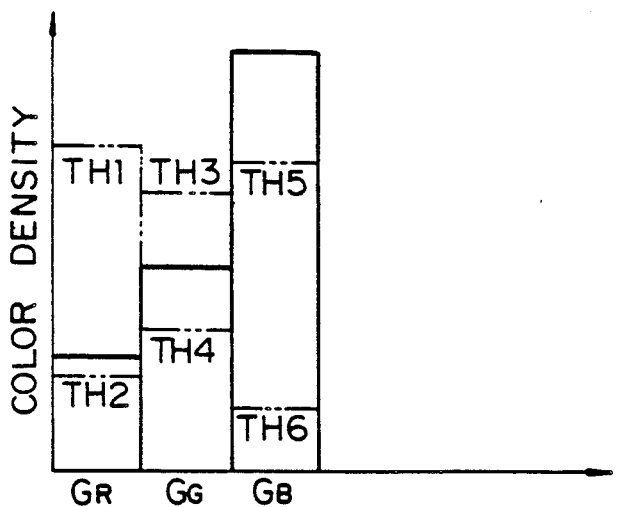
FIG. 15 is a graphic representation of another basic scheme for the logic modification of the color distribution illustrated in FIG. 12.

While it has been described that the color densities $Q_r$, $Q_g$ and $Q_b$ of red, green and blue, respectively, in a line of pixels are compared with a single common threshold value $Q_{TH}$ in executing the subroutine program A05, each of the color densities $Q_r$, $Q_g$ and $Q_b$ of a line of pixels may be compared with a threshold value proper to the color to which the particular color density relates. Alternatively, each of the color densities $Q_r$, $Q_g$ and $Q_b$ of a line of pixels may be compared with two or more different threshold values proper to the color to which the particular color density relates. In FIG. 15 of the drawings is shown an example in which the color density $Q_r$ of red is compared with first and second threshold values $Q_{TH1}$ and $Q_{TH2}$, the color density $Q_g$ of green is compared with third and fourth threshold values $Q_{TH3}$ and $Q_{TH4}$, and the color density $Q_b$ of blue is compared with fifth and sixth threshold values $Q_{TH5}$ and $Q_{TH6}$. Where each color density of a line of pixels is thus compared with two or more different threshold values, a bit sequence composed of a doubled or even larger number of bits can be generated from the supplied color-density signals $G_R$, $G_G$ and $G_B$ and accordingly the images represented by the signals $G_R$, $G_G$ can be analyzed in respect of a doubled or more number of colors in determining the "predominant" color.

It has further been described that the predominant color over the images of a scanned document sheet is determined from among the colors including achromatic colors such as white and black. Because, however, of the fact that achromatic colors have predominantly large shares in ordinary document sheets, such colors may be excluded from consideration in determining the predominant color.

After either any one of the optional sets of multiplicand parameters $(a_{ij})k$ or the standard set of parameters $(a_{ij})s$ is selected through execution of the subroutine program A05 as hereinbefore described, the microprocessor 52 executes the true scan mode control subroutine program A07. Through execution of this true scan mode control subroutine program A07, the microprocessor 52 first generates the quantity-of-ink data data DQ for cyanic-colored ink on the basis of the multiplicand parameters $a_{00}$ to $a_{02}$ of the selected set and distributes the data DQ to the memories 62a, 62b and 62c of the conversion table network 62 of the masking circuit 50 illustrated in FIG. 4. When a print start signal of logic value "1" is input to the microprocessor 52 with the print start key on the control panel depressed by the operator of the apparatus, the microprocessor 52 activates the drivers 54 and 56 for the image scanner 20/38 and scanner drive motor 22 to start a first cycle of scanning operation for the document sheet D to be duplicated. As a result of this first cycle of scanning operation, the signal $H_C$ indicative of the quantity $q_C$ of the cyanic-colored ink to be actually used for the reproduction of the images represented by the supplied signals $G_R$, $G_G$ and $G_B$ is produced by the masking circuit 50.

Upon completion of the first cycle of scanning operation for the document sheet D, the microprocessor 52 generates the quantity-of-ink data data DQ for magenta-colored ink on the basis of the parameters $a_{10}$ to $a_{12}$ of the selected set and distributes the data DQ to the memories 62a, 62b and 62c. The microprocessor 52 further activates the drivers 54 and 56 for the image scanner 20/38 and scanner drive motor 22 to start a second cycle of scanning operation for the same document sheet D. As a result of this second cycle of scanning operation, the signal $H_M$ indicative of the quantity $q_M$ of the magenta-colored ink to be used for the reproduction of the images represented by the signals $G_R$, $G_G$ and $G_B$ is produced by the masking circuit 50.

Subsequently to the second cycle of scanning operation for the document sheet D, then the microprocessor 52 generates the quantity-of-ink data data DQ for yellow-colored ink on the basis of the parameters $a_{20}$ to $a_{22}$ of the selected set and distributes the data DQ to the memories 62a, 62b and 62c. Thus, the microprocessor 52 further activates the drivers 54 and 56 for the image scanner 20/38 and scanner drive motor 22 to start a third cycle of scanning operation for the same document sheet D. As a result of this third cycle of scanning operation, the signal $H_Y$ indicative of the quantity $q_Y$ of the yellow-colored ink to be used for the reproduction of the images represented by the signals $G_R$, $G_G$ and $G_B$ is produced by the masking circuit 50.

TRUE SCAN MODE CONTROL SUBROUTINE PROGRAM

Description will be hereinafter made with reference to FIGS. 10A and 10B in regard to the true scan mode control subroutine program A06 to achieve these functions for the quantity-of-ink signals $H_C$, $H_M$ and $H_Y$. In the description to follow, it will be assumed that, from among the total of seven sets of multiplicand parameters $a_{00}$ to $a_{22}$ stored in the read-only memory 58, the set of parameters $(a_{ij})i$ in particular is selected either by the microprocessor 52 or by the operator of the apparatus. The selected set of parameters $(a_{ij})i$ may be either any one of the optional sets of parameters $(a_{ij})k$ or the standard set of parameters $(a_{ij})s$.

As has been noted, the quantity-of-ink data DQ1, DQ2 and DQ3 generated by the microprocessor 52 are stored into the memories 62a, 62b and 62c, respectively, at a total of 256 addresses designated by bit sequences "00000000" to "11111111" in each of the memories 62a, 62b and 62c. The quantity-of-ink data DQ1 stored into the memory 62a is formulated particularly in respect of, for example, the parameter $a_{00}$ which is herein assumed to be given by the bit sequence "10110010". Thus, a total of 256 pieces of quantity-of-ink data DQ1 are provided in respect of the parameter $a_{00}$ by the combination of the bit sequence "10110010" representing the parameter $a_{00}$ and the addresses designated by the bit sequences "00000000" to "11111111" for the memory 62a. The true scan mode control subroutine program A07 is executed to store pieces of quantity-of-ink data DQ1 into the memory 62a in respect of each of the parameters $a_{00}$, $a_{10}$ and $a_{20}$, 256 pieces of quantity-of-ink data DQ2 into the memory 62b in respect of each of the parameters $a_{01}$, $a_{11}$ and $a_{21}$, and 256 pieces of quantity-of-ink data DQ3 into the memory 62c in respect of each of the parameters $a_{02}$, $a_{12}$ and $a_{22}$.

Figure 10A:
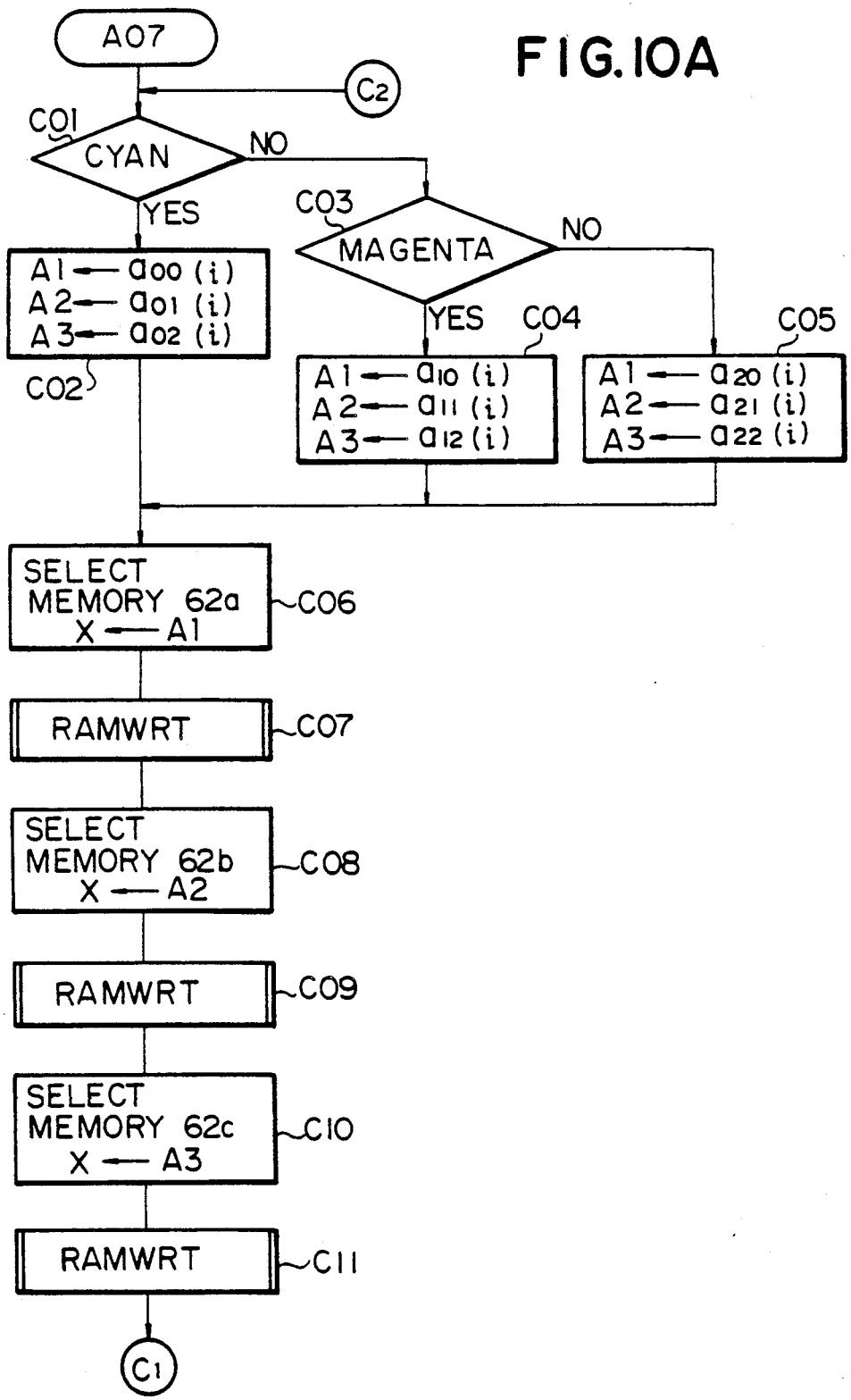
FIGS. 10A and 10B are flowcharts showing the details of a true scan mode control subroutine program included in the main routine program illustrated in FIG. 8.

Referring to FIG. 10A, the true scan mode control subroutine program A07 start with a decision step C01 at which the microprocessor 52 checks if the quantity-of-ink data DQ is to be generated in respect of the parameters $a_{00}$ to $a_{02}$ relating to the cyanic-colored ink. If the answer for this step C01 is given in the affirmative, the microprocessor 52 proceeds to step C02 to retain the parameters $a_{00}$, $a_{01}$ and $a_{02}$ in data storage areas A1, A2 and A3, respectively, of the memory 58. The parenthesized subscript "i" to each of the parameters $a_{00}$, $a_{01}$ and $a_{02}$ shown in the block for step C02 (and elsewhere) indicates that the parameter is included in the set of parameters $(a_{ij})i$ selected from among the total of seven sets of parameters $a_{00}$ to $a_{22}$ stored in the read-only memory 58.

If it is found at step C01 that the quantity-of-ink data DQ is to be generated not in respect of the parameters $a_{00}$ to $a_{02}$ relating to the magenta-colored ink, the answer for this step C01 is given in the negative. In this instance, the microprocessor 52 proceeds to step C03 to check if the quantity-of-ink data DQ is to be generated in respect of the parameters $a_{10}$ to $a_{12}$ relating to the magenta-colored ink. If the answer for this step C03 is given in the affirmative, the microprocessor 52 proceeds to step C04 to retain the parameters $a_{10}$, $a_{11}$ and $a_{12}$ in the data storage areas A1, A2 and A3, respectively, from the memory 58.

If it is found at step C03 that the quantity-of-ink data DQ is to be generated not in respect of the parameters $a_{10}$ to $a_{12}$ relating to the magenta-colored ink, the answer for this step C03 is given in the negative. In this instance, the microprocessor 52 determines that the quantity-of-ink data DQ is to be generated in respect of the parameters $a_{20}$ to $a_{22}$ relating to the yellow-colored ink and as such proceeds to step C05 to retain the parameters $a_{20}$, $a_{21}$ and $a_{22}$ in the data storage areas A1, A2 and A3, respectively, from the memory 58.

Thus, the microprocessor 52 proceeds from the step C02, C03 or C05 to step C06 to select the first memory 62a and store the parameter $a_{00}$, $a_{10}$ or $a_{20}$ into a data storage area "X" from the data storage area A1. The microprocessor 52 then proceeds to data write subroutine program "RAMWRT" C07 to generate the quantity-of-ink data DQ1 on the basis of the parameter $a_{00}$, $a_{10}$ or $a_{20}$ stored in the data storage area "X" and load the data DQ1 into the memory 62a through the data input/output terminals $D_0$ to $D_7$ of the selected memory 62a. The data DQ1 is stored at the addresses respectively represented by the address signals AD successively supplied to of the memory 62a.

For this purpose, the microprocessor 52 supplies the bus control signal BC to the first selector 60a of the first-stage switching network 60 and the first selector 64a of the second-stage switching network 64 of the masking circuit 50. The address bus 68 is connected through the selector 60a to the address terminals $A_0$ to $A_7$ of the first memory 62a of the conversion table network 62 and the data bus 70 is connected through the selector 64a to the data input/output terminals $D_0$ to $D_7$ of the memory 62a. The microprocessor 52 further supplies the write/read control signal W/R to the memory 62a to enable the memory 62a to operate in a data write cycle. The first memory 62a of the conversion table network 62 is now held under the control of the microprocessor 52 and is ready to receive the quantity-of-ink data from the output data buffer of the microprocessor 52.

The microprocessor 52 then outputs a succession of address signals AD to the address bus 68. This succession of address signals AD starts with the address "00000000" and is successively incremented toward the final address "11111111". Then, the microprocessor 52 releases the quantity-of-ink data DQ1 for the cyanic-, magenta- or yellow-colored ink from the outout data buffer thereof and transmits the quantity-of-ink data DQ1 to the memory 62a through the data bus 70 and the selectors 64a of the second-stage switching network 64 and loads the data DQ1 into the memory 62a through the data input/output terminals $D_0$ to $D_7$ of the memory 62a in synchronism with the address signals AD supplied to the address terminals $A_0$ to $A_7$ of the memory 62a through the address bus 68.

After the quantity-of-ink data DQ1 is stored into the first memory 62a of the conversion table network 62 through execution of the data write subroutine program "RAMWRT" C07, the microprocessor 52 proceeds to step C08 to select the second memory 52b and store the parameter $a_{01}$, $a_{11}$ or $a_{11}$ into the data storage area "X" from the data storage area A2. The microprocessor 52 then proceeds to data write subroutine program "RAMWRT" C09 to generate the quantity-of-ink data DQ2 on the basis of the parameter $a_{01}$, $a_{11}$ and $a_{21}$ stored in the data storage area "X" and load the data DQ2 into the memory 62b through the data input/output terminals $D_0$ to $D_7$ of the memory 62b. The data DQ2 is stored at the addresses respectively represented by the address signals AD succcessively supplied to of the memory 62b similarly to the data DQ1 processed at step C/7.

After the quantity-of-ink data DQ2 is stored into the second memory 62b of the conversion table network 62 through execution of the data write subroutine program "RAMWRT" C09, the microprocessor 52 proceeds to steps C10 and C11. At steps C10 and C11, the data DQ3 is generated on the basis of the parameter $a_{02}$, $a_{12}$ and $a_{22}$ stored in the data storage area "X" and is loaded into the third memory 62c through the data input/output terminals $D_0$ to $D_7$ of the memory 62c. The data DQ3 is stored at the addresses respectively represented by the address signals AD succcessively supplied to of the memory 62c also similarly to the data DQ1 processed at step C/7.

Figure 10B:
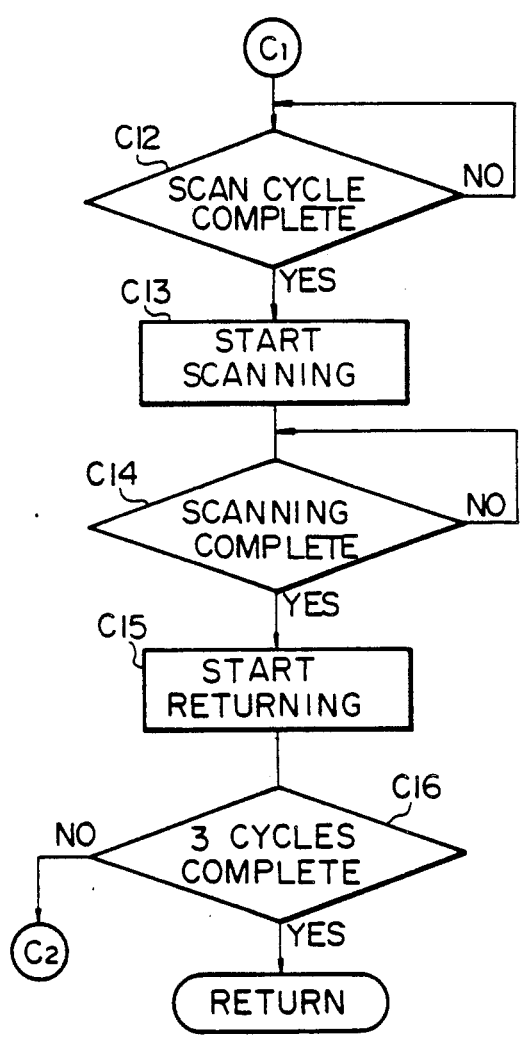

Upon termination of the data write subroutine program C11, the microprocessor 52 proceeds to step C12 shown in FIG. 10B to check if the first cycle of scanning operation has been terminated with the image scanner 20/38 moved back to its respective home position. Such a test may be made on the basis of signals produced by suitable position sensors located in conjunction with the image scanner 20/38, though not shown in the drawings. If the answer for this decision step C12 is given in the negative, the step C12 is repeated until the answer for the step C12 turns affirmative. When it is found that the backward stroke the scanner 20/38 is complete, the microprocessor 50 activates the scanner drive motor 22 as at step C13 to drive the image scanner 20/38 in the direction of arrow a to scan the document sheet D which is currently desired to be duplicated. Thus, the image scanner 20/38 is actuated to start the forward stroke of the subsequent scanning operation.

The microprocessor 52 then detects at step C14 whether or not the forward stroke of the scanner 20/38 is complete. If the answer for this decision step C14 is given in the negative, the step C14 is repeated until the answer for the step C14 turns affirmative. When it is found that the forward stroke of the scanner 20/38 is complete with the image scanner 20/38 moved to a predetermined foremost position with respect to the document sheet D, the microprocessor 50 re-activates the scanner drive motor 22 as at step C15 to drive the image scanner 20/38 in the reverse direction of arrow a' to return toward its home position.

The microprocessor 52 then proceeds to step C17 to check if the three successive cycles of scanning for the document sheet D currently in place are complete. If the answer for this step C17 is given in the negative, the microprocessor 52 reverts to step C01 and repeats the loop of the steps C01 to C17. When the third cycle of scanning operation is found to be complete at step C17 and accordingly the answer for the step C17 is given in the affirmative, the microprocessor 52.

In consequence of the first, second and third cycles of scanning and printing operation, pixels are printed in cyan, magenta and yellow on a suitable record medium such as typically a sheet of paper. The image pattern thus printed on the record medium may thus include areas printed in each of cyan, magenta and yellow and areas printed in any two or three of the three colors with pixels of one color superposed on or located adjacent to those of another. It then returns to the main routine program described with reference to FIG. 8 and thus terminates execution of the main routine program.

DATA WRITE SUBROUTINE PROGRAM "RAMWRT"

Figure 11:
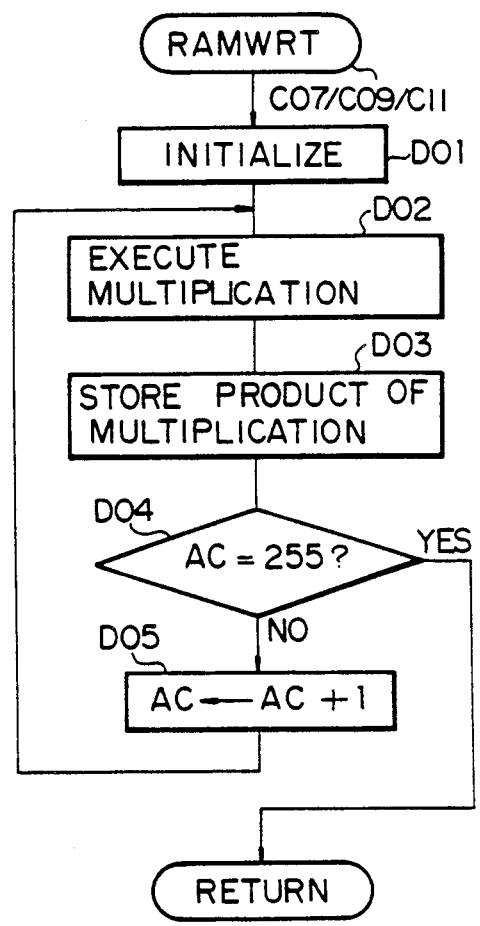
FIG. 11 is a flowchart showing the details of a data write subroutine program included in the true scan mode control subroutine program illustrated in FIGS. 10A and 10B.

Description will now be made with reference to FIG. 11 in regard to the data write subroutine programs "RAMWRT" C07, C09 and C11.

Each of these data write subroutine programs "RAMWRT" C07, C09 and C11 start with step D01 at which the microprocessor 52 initializes the address of the memory 62a, 62a or 62c which is selected at step C06, C08 or C10, respectively. The microprocessor 52 then proceeds to a series of steps D02 to execute multiplication of the value stored in the data storage area "X" by the value of the address count AC. The microprocessor 52 then proceeds to step D03 to store the product of multiplication calculated at C02 into the memory 62a, 62b or 62c at the address represented by the value of the address count AC. That is, the microprocessor 52 loads the data DQ1, DQ2 or DQ3 into any of the memories 62a, 62b and 62a through the data input/output terminals $D_0$ to $D_7$ of any of the memory 62a, 62b or 62c in synchronism with the address signals AD supplied to the address terminals $A_0$ to $A_7$ of the memory 62a, 62b or 62c through the address bus 68.

Upon termination of the step D03, the microprocessor 52 proceeds to step D04 to detect whether or not all the addresses 0 to 255 in the memory 62a, 62b or 62c under consideration have been accessed. If it is found at this step D04 that the number assigned to the address which has just been accessed in the memory 62a, 62b or 62c is short of 255 and thus the answer for the step D04 is given in the negative, the microprocessor 52 proceeds to step D05 to increment the number AC of address and thereafter reverts to step D02 to repeat the loop of the steps D02 to D05. When the final address 255 in the memory 62a, 62b or 62c under consideration is accessed and accordingly the answer for the step D04 turns affirmative, the microprocessor 52 puts an end to this subroutine program "RAMWRT" and returns to the true scan mode control program A07 and may proceed to step C08, C10 or C12.

While the fixed multiplicand parameters $a_{00}$ to $a_{22}$ used in the masking circuit 50 of the colored image reading apparatus embodying the present invention have been assumed to have positive values, there may be cases where the parameters assume negative values. In consideration of this, it is preferable that the weighted-parameter summing circuit 66 used in the masking circuit embodying the present invention be designed to be of the type capable of summing up both positive and negative input signals. In this instance, the data representing each of the negative-value parameters to be stored into the memories 62a, 62b and 62c may be formulated to have its most significant bit (MSB) assigned to a sign bit followed by a sequence of bits representing a complement of the negative value. Alternatively, an appropriate sign control circuit may be provided between the summing circuit 66 and the memories 62a, 62b and 62c to control the summing circuit 66 to perform summing operation in a negative mode for an input signal representing a negative value.

What is claimed is:

1. A colored image reading apparatus for use in reproducing multi-color images with toning materials of different colors and having different properties, comprising:

a) a color image sensor operative to optically scan a document bearing multi-color images to read the images on the document and produce color-density signals respectively variable with the intensities of light of red, green, and blue components of said images;

b) masking means for converting said color-density signals into signals dictated by the properties of the toning materials with which said images are to be reproduced, said masking means comprising, b/1) first memory means of the random-access type, and b/2) second memory means storing data representative of a plurality of sets of parameters, each set of parameters being provided in respect of each of a plurality of colors each having a limited range of hues and being prescribed to enable reproduction of images of particular hues preferentially over images of other hues;

c) calculating means operative to, selectively fetch any of said plurality of sets of parameters from said second memory means, generates data representative of products of multiplication between the parameters of the selected set and numerical values respectively represented by said color-density signals, and load the data representative of the products of multiplication into said first memory means, and d) input/output means operative to, supply to said first memory means address signals provided by the color-density signals input to said masking means, fetch the data stored in said first memory means in response to the address signals, and generate data representative of the sum of the fetched data concerning the red, green, and blue components of said images output as data effective to reproduce said multi-color images.

2. A colored image reading apparatus as set forth in claim 1, further comprising manually operable selecting means capable of selecting any of said plurality of sets of parameters to be fetched by said calculating means from said second memory means.

3. A colored image reading apparatus as set forth in claim 1, further comprising selecting means responsive to said color-density signals supplied from said color image sensor and capable of selecting any of said plurality of sets of parameters to be fetched by said calculating means from said second memory means.

4. A colored image reading apparatus for use in reproducing multi-color images with toning materials of different colors and having different properties, comprising:

a) a color image sensor operative to optically scan a document bearing multi-color images to read the images on the document and produce color-density signals respectively variable with the intensities of light of red, green and blue components of said images, b) masking means for converting said color-density signals into signals dictated by the properties of the toning materials with which said images are to be reproduced, said masking means being responsive to a set of parameters selected from a plurality of sets of parameters, each set of parameters being provided in respect of each of a plurality of colors each having a limited range of hues and being prescribed to enable reproduction of images of particular hues preferentially over images of other hues, said masking means comprising, b/1) converting means operative to generate data representative of products of multiplication between the parameters of the selected set and numerical values respectively represented by said color-density signals, b/2) summing means for generating data representative of the sum of the products of multiplication concerning the red, green and blue components of said images.

5. A colored image reading apparatus as set forth in claim 4, further comprising manually operable selecting means capable of selecting any of said plurality of sets of parameters to be fetched by said converting means.

6. A colored image reading apparatus as set forth in claim 4, further comprising selecting means responsive to said color-density signals supplied from said color image sensor and capable of selecting any of said plurality of sets of parameters to be processed by said converting means.

7. A colored image reading apparatus for use in reproducing multi-color images with toning materials of different colors and having different properties, comprising:

a) a color image sensor operative to optically scan a document bearing multi-color images to read the images on the document and produce color-density signals respectively variable with the intensities of light of red, green and blue components of said images, b) scanning means for driving one of said color image sensor and said document for reciprocating movement with respect to the other for enabling said color image sensor to optically scan the images on said document, the scanning means being operative to drive said one of the color image sensor and the document for a single cycle of reciprocating movement during reproduction of multi-color images with the toning material of a single color, each cycle of reciprocating movement of the scanning means consisting of a former half for driving one of said color image sensor and said document for movement in one direction with respect to said document and enabling said color image sensor to optically scan the images on said document and a latter half for driving said one of said color image sensor and said document for movement in the reverse direction with respect to said document, b) masking means for converting said color-density signals into signals dictated by the properties of the toning materials with which said images are to be reproduced, said masking means comprising, b/1) first memory means of the random-access type, b/2) second memory means storing a plurality of sets of data for use in converting said color-density signals into the signals dictated by the properties of the toning materials, each set of data being provided in respect of each of a plurality of colors each having a limited range of hues and being prescribed to enable reproduction of images of particular hues preferentially over images of other hues, each of said plurality of sets of data comprising a plurality of data elements respectively corresponding to the colors of said toning materials, said data elements being effective to convert said color-density signals concerning the red, green and blue components of the scanned images into signals concerning the colors of said toning materials, c) control means operative to, selectively fetch any of said plurality of sets of data from said second memory means and a particular one of the data elements in the selected set of data during the latter half of a cycle of reciprocating movement of the scanning means, said particular one of the data elements corresponding to the color of one of said toning materials in which said images are to be reproduced subsequently to the cycle of reciprocating movement of the scanning means during which the images are to be reproduced in the color of another toning materials, and generate data representative of products of multiplication between the data elements of the selected set of data and numerical values respectively represented by said color-density signals, load the data representative of the products of multiplication into said first memory means, and d) input/output means operative to, supply to said first memory means address signals provided by the color-density signals input to said masking means, fetch the data stored in said first memory means in response to the address signals generate data representative of the sum of the products of multiplication concerning the red, green and blue components of said images, and output the data representative of the sum of the products of multiplication as data effective to reproduce said multi-color images.

8. A colored image reading apparatus as set forth in claim 7, further comprising manually operable selecting means capable of selecting any of said plurality of sets of data to be fetched by said control means from said second memory means.

9. A colored image reading apparatus as set forth in claim 7, further comprising selecting means responsive to said color-density signals supplied from said color image sensor and capable of selecting any of said plurality of sets of data to be fetched by said control means from said second memory means.

10. A colored image reading apparatus for use in reproducing multi-color images with toning materials of different colors and having different properties, comprising:

a) a color image sensor operative to optically scan a document bearing multi-color images to read the images on the document and produce color-density signals respectively variable with the intensities of light of red, green and blue components of said images, b) scanning means for driving one of said color image sensor and said document for reciprocating movement with respect to the other for enabling said color image sensor to optically scan the images on said documents, the scanning means being operative to drive said one of the color image sensor and the document for a single cycle of reciprocating movement during reproduction of multi-color images with the toning material of a single color, c) masking means for converting said color-density signals into signals dictated by the properties of the toning materials with which said images are to be reproduced, said masking means being responsive to a set of parameters selected from a plurality of sets of parameters, each set of parameters being provided in respect of each of a plurality of colors each having a limited range of hues and being prescribed to enable reproduction of images of particular hues preferentially over images of other hues, said masking means comprising, c/1) converting means operative to generate data representative of products of multiplication between the parameters of the selected set and numerical values respectively represented by said color-density signals, c/2) summing means for generating data representative of the sum of the products of multiplication concerning the red, green and blue components of said images, and d) selecting means operative to preliminarily scan the images on the document before the images on the document are read by said color image sensor, the selecting means being responsive to said color-density signals supplied from said color image sensor and capable of selecting any of said plurality of sets of parameters to be processed by said converting means.

* * * * *

UNITED STATES PATENT AND TRADEMARK OFFICE
CERTIFICATE OF CORRECTION

PATENT NO. : 4,992,863

DATED : February 12, 1991

INVENTOR(S) : Shigeru MORIYA

It is certified that error appears in the above-identified patent and that said Letters Patent is hereby corrected as shown below:

In column 28, line 18, delete "processed" and insert --fetched--.

In column 29, line 4, delete "selectively fetch any" and insert --select one--;

line 5, delete "from said second memory means"; also after "and" insert --fetch--;

line 7, after "data" insert --from said second memory means";

line 17, delete "of" and insert --in--;

line 27, after "signals" and insert --,--;

line 36, delete "any of said plurality of sets of data" and insert --a particular one of the data elements--;

UNITED STATES PATENT AND TRADEMARK OFFICE
CERTIFICATE OF CORRECTION

PATENT NO. : 4,992,863

DATED : February 12, 1991

INVENTOR(S) : Shigeru Moriya

It is certified that error appears in the above-identified patent and that said Letters Patent is hereby corrected as shown below:

Column 29, line 42, delete "any of said plurality of sets of data" and insert --a particular one of the data elements--.

Signed and Sealed this

Fifteenth Day of September, 1992

*Attest:*

DOUGLAS B. COMER

*Attesting Officer*     *Acting Commissioner of Patents and Trademarks*